United States Patent
Topolkaraev et al.

(10) Patent No.: US 11,286,362 B2
(45) Date of Patent: *Mar. 29, 2022

(54) POLYMERIC MATERIAL FOR USE IN THERMAL INSULATION

(71) Applicant: Kimberly-Clark Worldwide, Inc., Neenah, WI (US)

(72) Inventors: Vasily A. Topolkaraev, Appleton, WI (US); Ryan J. McEneany, Appleton, WI (US); Neil T. Scholl, Neenah, WI (US); Charles Wilson Colman, Marietta, GA (US); Mark M. Mleziva, Appleton, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/895,510

(22) PCT Filed: Jun. 6, 2014

(86) PCT No.: PCT/IB2014/062028
§ 371 (c)(1),
(2) Date: Dec. 3, 2015

(87) PCT Pub. No.: WO2014/199276
PCT Pub. Date: Dec. 18, 2014

(65) Prior Publication Data
US 2016/0122491 A1     May 5, 2016

Related U.S. Application Data

(60) Provisional application No. 61/833,992, filed on Jun. 12, 2013, provisional application No. 61/907,562, filed on Nov. 22, 2013.

(51) Int. Cl.
*C08J 9/00* (2006.01)
*C08L 67/00* (2006.01)
(Continued)

(52) U.S. Cl.
CPC ............. *C08J 9/0061* (2013.01); *C08K 9/04* (2013.01); *C08L 23/0884* (2013.01);
(Continued)

(58) Field of Classification Search
CPC ....... C08J 2205/048; C08J 9/0071–008; C08L 67/04
See application file for complete search history.

(56) References Cited

U.S. PATENT DOCUMENTS 3,354,506 A   11/1967  Raley
3,423,255 A   1/1969   Joyce
(Continued)

FOREIGN PATENT DOCUMENTS

CA   2289622 A1 *  11/1998  ........... A41D 13/018
EP   0348887 A2    1/1990
(Continued)

OTHER PUBLICATIONS

Polyaramid Polyparaphenylene Terephthalamide Properties and Applications—Supplier Data by Goodfellow. http://www.azom.com/article.aspx?ArticleID=1992. As viewed on Aug. 26, 2016.*
(Continued)

*Primary Examiner* — Stephen E Rieth
(74) *Attorney, Agent, or Firm* — Dority & Manning, P.A.

(57) ABSTRACT

A polymeric material for use in thermal insulation is provided. The polymeric material is formed from a thermoplastic composition containing a continuous phase that includes a matrix polymer and within which a microinclusion additive and nanoinclusion additive are dispersed in the form of discrete domains. A porous network is defined in the mate-
(Continued)

rial that includes a plurality of nanopores having an average cross-sectional dimension of about 800 nanometers or less. The polymeric material exhibits a thermal conductivity of about 0.20 watts per meter-kelvin or less.

22 Claims, 14 Drawing Sheets

(51) Int. Cl.
    *C08K 9/04*         (2006.01)
    *C08L 23/12*       (2006.01)
    *C08L 71/02*       (2006.01)
    *C08L 67/04*       (2006.01)
    *C08L 23/08*       (2006.01)
    *C08L 23/16*       (2006.01)

(52) U.S. Cl.
    CPC .............. *C08L 23/12* (2013.01); *C08L 23/16* (2013.01); *C08L 67/00* (2013.01); *C08L 67/04* (2013.01); *C08L 71/02* (2013.01); *C08J 2323/12* (2013.01); *C08J 2367/04* (2013.01); *C08J 2423/02* (2013.01); *C08J 2423/08* (2013.01); *C08J 2423/12* (2013.01); *C08J 2425/08* (2013.01); *C08J 2463/00* (2013.01); *C08J 2467/04* (2013.01); *C08L 2203/12* (2013.01); *C08L 2203/16* (2013.01)

(56) References Cited

U.S. PATENT DOCUMENTS

| | | | |
|---|---|---|---|
| 3,499,819 A * | 3/1970 | Lewis | C08J 5/124 |
| | | | 156/79 |
| 3,650,649 A | 3/1972 | Schippers | |
| 3,801,429 A | 4/1974 | Schrenk et al. | |
| 3,802,817 A | 4/1974 | Matsuki et al. | |
| 3,855,046 A | 12/1974 | Hansen et al. | |
| 4,041,203 A | 8/1977 | Brock et al. | |
| 4,100,324 A | 7/1978 | Anderson et al. | |
| 4,282,735 A | 8/1981 | Break | |
| 4,374,888 A | 2/1983 | Bornslaeger | |
| 4,557,132 A | 12/1985 | Break | |
| 4,698,372 A | 10/1987 | Moss | |
| 4,704,116 A | 11/1987 | Enloe | |
| 4,705,935 A * | 11/1987 | Traffanstedt | A41B 11/00 |
| | | | 219/211 |
| 4,766,029 A | 8/1988 | Brock et al. | |
| 4,797,468 A | 1/1989 | De Vries | |
| 4,798,603 A | 1/1989 | Meyer et al. | |
| 4,801,494 A | 1/1989 | Datta et al. | |
| 4,908,026 A | 3/1990 | Sukiennik et al. | |
| 4,937,299 A | 6/1990 | Ewen et al. | |
| D315,990 S | 4/1991 | Blenke et al. | |
| 5,169,706 A | 12/1992 | Collier, IV et al. | |
| 5,179,164 A | 1/1993 | Lausberg et al. | |
| 5,192,606 A | 3/1993 | Proxmire et al. | |
| 5,213,881 A | 5/1993 | Timmons et al. | |
| 5,218,071 A | 6/1993 | Tsutsui et al. | |
| 5,248,309 A | 9/1993 | Serbiak et al. | |
| 5,272,236 A | 12/1993 | Lai et al. | |
| 5,278,272 A | 1/1994 | Lai et al. | |
| 5,284,309 A | 2/1994 | Salvatore et al. | |
| 5,284,703 A | 2/1994 | Everhart et al. | |
| 5,322,728 A | 6/1994 | Davey et al. | |
| 5,350,624 A | 9/1994 | Georger et al. | |
| D358,035 S | 5/1995 | Zander et al. | |
| 5,464,688 A | 11/1995 | Timmons et al. | |
| 5,470,944 A | 11/1995 | Bonsignore | |
| 5,472,775 A | 12/1995 | Obijeski et al. | |
| 5,486,166 A | 1/1996 | Bishop et al. | |
| 5,490,846 A | 2/1996 | Ellis et al. | |
| 5,539,056 A | 7/1996 | Yang et al. | |
| 5,571,619 A | 11/1996 | McAlpin et al. | |
| 5,596,052 A | 1/1997 | Resconi et al. | |
| 5,620,779 A | 4/1997 | Levy et al. | |
| D384,508 S | 10/1997 | Zander et al. | |
| D384,819 S | 10/1997 | Zander et al. | |
| 5,679,432 A * | 10/1997 | Holmquest | B32B 5/18 |
| | | | 428/318.4 |
| 5,702,377 A | 12/1997 | Collier, IV et al. | |
| D390,708 S | 2/1998 | Brown | |
| 5,766,760 A | 6/1998 | Tsai et al. | |
| 5,770,682 A | 6/1998 | Ohara et al. | |
| 5,821,327 A | 10/1998 | Oota et al. | |
| 5,843,057 A | 12/1998 | McCormack | |
| 5,855,999 A | 1/1999 | McCormack | |
| 5,880,254 A | 3/1999 | Ohara et al. | |
| 5,931,823 A | 8/1999 | Stokes et al. | |
| 5,932,497 A | 8/1999 | Morman et al. | |
| 5,962,112 A | 10/1999 | Haynes et al. | |
| 5,968,643 A | 10/1999 | Topolkaraev et al. | |
| 5,997,981 A | 12/1999 | McCormack et al. | |
| 6,002,064 A | 12/1999 | Kobylivker et al. | |
| D418,305 S | 1/2000 | Zander et al. | |
| 6,015,764 A | 1/2000 | McCormack et al. | |
| 6,037,033 A | 3/2000 | Hunter | |
| 6,037,281 A | 3/2000 | Mathis et al. | |
| 6,060,638 A | 5/2000 | Paul et al. | |
| 6,071,451 A | 6/2000 | Wang et al. | |
| D428,267 S | 7/2000 | Romano, III et al. | |
| 6,090,325 A | 7/2000 | Wheat et al. | |
| 6,093,665 A | 7/2000 | Sayovitz et al. | |
| 6,096,014 A | 8/2000 | Haffner et al. | |
| 6,111,163 A | 8/2000 | McCormack et al. | |
| 6,150,002 A | 11/2000 | Varona | |
| 6,214,933 B1 | 4/2001 | Wang et al. | |
| 6,268,048 B1 | 7/2001 | Topolkaraev et al. | |
| 6,326,458 B1 | 12/2001 | Gruber et al. | |
| 6,380,445 B1 | 4/2002 | Rietz et al. | |
| 6,389,864 B1 | 5/2002 | Chubb et al. | |
| 6,461,457 B1 | 10/2002 | Taylor et al. | |
| 6,485,446 B1 | 11/2002 | Brother et al. | |
| 6,500,563 B1 | 12/2002 | Datta et al. | |
| 6,582,810 B2 | 6/2003 | Heffelfinger | |
| 6,586,073 B2 | 7/2003 | Perez et al. | |
| 6,642,429 B1 | 11/2003 | Carter et al. | |
| 6,663,611 B2 | 12/2003 | Blaney et al. | |
| 6,716,203 B2 | 4/2004 | Sorebo et al. | |
| 6,824,680 B2 | 11/2004 | Chandavasu et al. | |
| 6,824,734 B2 | 11/2004 | Boggs et al. | |
| 7,060,867 B2 | 6/2006 | Jameson | |
| 7,097,904 B2 | 8/2006 | Ochi et al. | |
| 7,141,168 B2 | 11/2006 | Sakamoto et al. | |
| 7,341,776 B1 | 3/2008 | Milliren et al. | |
| 7,984,591 B2 | 7/2011 | Cashin et al. | |
| 7,998,579 B2 | 8/2011 | Lin et al. | |
| 8,105,682 B2 | 1/2012 | Sun et al. | |
| 8,268,738 B2 | 9/2012 | McEneany et al. | |
| 8,313,818 B2 | 11/2012 | Vo et al. | |
| 8,323,837 B2 | 12/2012 | Nishida et al. | |
| 8,334,327 B2 | 12/2012 | Kaufman et al. | |
| 8,362,145 B2 | 1/2013 | Li et al. | |
| 8,603,614 B2 | 12/2013 | Lam et al. | |
| 8,936,740 B2 | 1/2015 | Topolkaraev et al. | |
| 9,957,369 B2 * | 5/2018 | Topolkaraev | C08L 23/10 |
| 10,195,157 B2 * | 2/2019 | Topolkaraev | A61K 9/70 |
| 10,240,260 B2 * | 3/2019 | Topolkaraev | B29C 48/91 |
| 10,286,593 B2 * | 5/2019 | Topolkaraev | B29C 51/10 |
| 11,084,916 B2 * | 8/2021 | Topolkaraev | B29C 55/00 |
| 2003/0116462 A1 | 6/2003 | Sorebo et al. | |
| 2004/0002273 A1 | 1/2004 | Fitting et al. | |
| 2005/0054255 A1 | 3/2005 | Morman et al. | |
| 2005/0059941 A1 | 3/2005 | Baldwin et al. | |
| 2005/0119359 A1 | 6/2005 | Shelby et al. | |
| 2005/0245162 A1 | 11/2005 | McCormack et al. | |
| 2006/0288949 A1 * | 12/2006 | Axinte | A01K 1/0353 |
| | | | 119/169 |
| 2009/0008816 A1 | 1/2009 | Takita et al. | |
| 2009/0318884 A1 | 12/2009 | Meyer et al. | |
| 2009/0326152 A1 * | 12/2009 | Li | C08L 23/10 |
| | | | 525/190 |
| 2010/0068471 A1 | 3/2010 | Lubart et al. | |

(56) References Cited

U.S. PATENT DOCUMENTS

| | | | |
|---|---|---|---|
| 2010/0068484 A1* | 3/2010 | Kaufman | B32B 27/20 428/212 |
| 2010/0088970 A1* | 4/2010 | Miller | E04C 2/296 52/1 |
| 2010/0092754 A1* | 4/2010 | Nishida | C08J 5/18 428/220 |
| 2010/0305529 A1 | 12/2010 | Ashton et al. | |
| 2010/0313507 A1 | 12/2010 | Castro et al. | |
| 2011/0091714 A1 | 4/2011 | Chen et al. | |
| 2011/0183563 A1 | 7/2011 | Ochi et al. | |
| 2011/0252739 A1 | 10/2011 | Leeser et al. | |
| 2011/0256346 A1 | 10/2011 | Bowden et al. | |
| 2012/0040185 A1 | 2/2012 | Topolkaraev et al. | |
| 2012/0109090 A1 | 5/2012 | Reichardt et al. | |
| 2012/0225272 A1 | 9/2012 | Costeux et al. | |
| 2012/0231242 A1 | 9/2012 | Boyer et al. | |
| 2014/0044954 A1* | 2/2014 | Matsubara | B29C 44/04 428/318.8 |

FOREIGN PATENT DOCUMENTS

| | | | | |
|---|---|---|---|---|
| EP | 0609881 | A1 | 8/1994 | |
| EP | 0609881 | B1 | 8/1999 | |
| EP | 1152025 | A1 | 11/2001 | |
| JP | 2008144039 | A * | 6/2008 | |
| RU | 2218368 | C2 | 12/2003 | |
| RU | 2426760 | C1 | 8/2011 | |
| RU | 2476456 | C2 | 2/2013 | |
| WO | WO 99/32272 | A1 | 7/1999 | |
| WO | WO 2008007919 | | 1/2008 | |
| WO | WO2009/152021 | A2 | 12/2009 | |
| WO | WO 2012147529 | A1 * | 11/2012 | B29C 44/04 |
| WO | WO2013066487 | | 5/2013 | |
| WO | WO2014/199268 | | 12/2014 | |
| WO | WO2014/199269 | | 12/2014 | |
| WO | WO2014/199270 | | 12/2014 | |
| WO | WO2014/199271 | | 12/2014 | |
| WO | WO2014/199272 | | 12/2014 | |
| WO | WO2014/199273 | | 12/2014 | |
| WO | WO2014/199274 | | 12/2014 | |
| WO | WO2014/199275 | | 12/2014 | |
| WO | WO2014/199277 | | 12/2014 | |
| WO | WO2014/199278 | | 12/2014 | |
| WO | WO2014/199279 | | 12/2014 | |

OTHER PUBLICATIONS

Typical Engineering Properties of Polypropylene. Ineos Olefins & Polymers USA. Apr. 2014.*
Machine Translation of JP2008-144039A. Jun. 26, 2008. (Year: 2008).*
Partial Written Translation of JP2008-144039A. Jun. 26, 2008. (Year: 2008).*
Written translation of paragraph 24 of JP2008-144039A. Jun. 26, 2008. (Year: 2008).*
Epoxy modified silicone oil and Polyether modified silicone oil. Zhejiang Runhe Chemical New Material Co. www.runhesilicone.com/info/epoxy-modified-silicone-oil-and-polyether-modi-26409215.html. As viewed on Jul. 27, 2020. (Year: 2020).*
Whelan, T. Polymer Technology Dictionary. 1994. Springer Science+Business Media Dordrecht. pp. 173 and 181. (Year: 1994).*
Poly(lactide). Polymers: A Property Database. 2017. CRC Press. Taylor & Francis Group. (Year: 2017).*
Lee et al., "Development of Discrete Nanopores 1: Tension of Polypropylene/Polyethylene Copolymer Blends," *Journal of Applied Polymer Science*, vol. 91, No. 6, Mar. 15, 2004, pp. 3462-3650.
International Search Report and Written Opinion for PCT/IB2014/062028 dated Sep. 24, 2014, 13 pages.
European Search Report dated Dec. 16, 2016, 2 pages.
Russian Office Action Corresponding to Application No. 22015155675 dated Feb. 10, 2017.

* cited by examiner

POLYMERIC MATERIAL FOR USE IN THERMAL INSULATION

RELATED APPLICATION

The present application is the national stage entry of international Patent Application No, PCT/IB2014/062028 having a filing date of Jun. 6, 2014, which claims priority to U.S. provisional applications Ser. No. 61/833,992, filed on Jun. 12, 2013, and 61/907,566, on filed Nov. 22, 2013, which are incorporated herein in their entirety by reference thereto.

BACKGROUND OF THE INVENTION

Polymeric foams are commonly employed in thermal insulation. In typical foam insulation, the dominant mode of heat transfer is cell gas conduction. When the cell size of such foams is less than about one micrometer, for example, the thermal conductivity general decreases as fewer cell gas molecules are available within each cell to collide and transfer heat within each single cell—a phenomenon often referred to as the Knudsen Effect. The Knudsen Effect is particularly significant as the cell size and connectivity between cells becomes on the same order of magnitude as the mean free path of the gas filling the cells. For this reason, nano-scale cell sizes are desired in foams to maximize the Knudsen Effect. Unfortunately, attempts to reduce the cell size of polymeric foams often compromise the processability and tensile properties of the resulting material due to uncontrolled pore size and distribution. Other problems also exist. Many polymers (e.g., polyesters), for example, have a relatively high glass transition temperature and typically demonstrate a very high stiffness, while having relatively low ductility/elongations at break. Such low tensile elongation values significantly limit the use of such polymers in thermal insulation, where a good balance between strength and ductility is required.

As such, a need currently exists for an improved material that can be used in thermal insulation.

SUMMARY OF THE INVENTION

In accordance with one embodiment of the present invention, a polymeric material is disclosed for use in thermal insulation. The polymeric material is formed from a thermoplastic composition containing a continuous phase that includes a matrix polymer and within which a microinclusion additive and nanoinclusion additive are dispersed in the form of discrete domains. A porous network is defined in the material that includes a plurality of nanopores having an average cross-sectional dimension of about 800 nanometers or less. The polymeric material exhibits a thermal conductivity of about 0.20 watts per meter-kelvin or less.

Other features and aspects of the present invention are discussed in greater detail below.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended figures in which.

Figure 1:
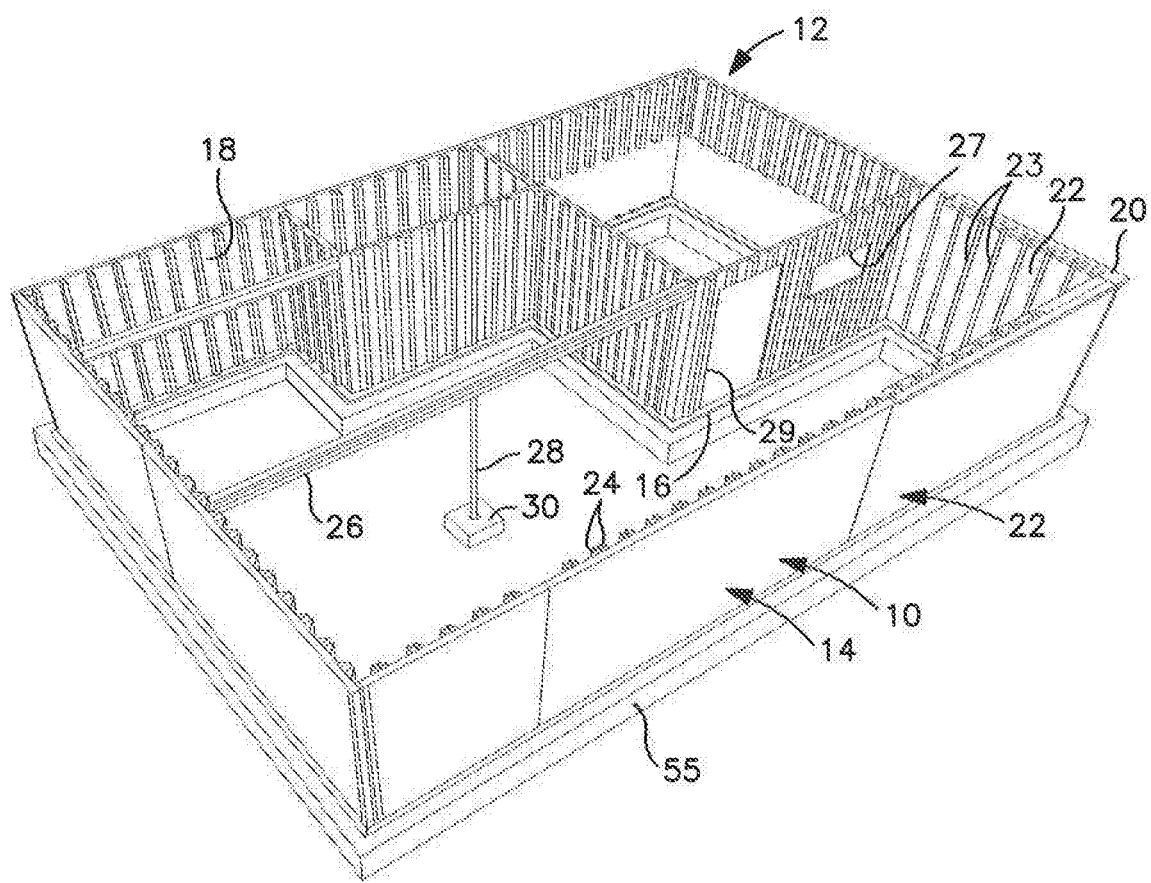
FIG. 1 shows a partial representative view of a building foundation wall fabricated with a building panel that may be formed in accordance with the invention.

Repeat use of references characters in the present specification and drawings is intended to represent same or analogous features or elements of the invention.

DETAILED DESCRIPTION OF REPRESENTATIVE EMBODIMENTS

Reference now will be made in detail to various embodiments of the invention, one or more examples of which are set forth below. Each example is provided by way of explanation of the invention, not limitation of the invention. In fact, it will be apparent to those skilled in the art that various modifications and variations may be made in the present invention without departing from the scope or spirit of the invention. For instance, features illustrated or described as part of one embodiment, may be used on another embodiment to yield a still further embodiment. Thus, it is intended that the present invention covers such modifications and variations as come within the scope of the appended claims and their equivalents.

Generally speaking, the present invention is directed to a polymeric material (e.g., film, fibrous material, etc.) for use in thermal insulation. The polymeric material acts as a thermal barrier and thus exhibits a relatively low thermal conductivity, such as about 0.20 watts per meter-kelvin ("W/m-K") or less, in some embodiments about 0.15 W/m-K or less, in some embodiments from about 0.01 to about 0.12 W/m-K, and in some embodiments, from about 0.02 to about 0.10 W/m-K. Notably, the material is capable of achieving such low thermal conductivity values at relatively low thicknesses, which can allow the material to possess a greater degree of flexibility and conformability, as well as reduce the space it occupies in an article. For this reason, the polymeric material may also exhibit a relatively low "thermal admittance", which is equal to the thermal conductivity of the material divided by its thickness and is provided in units of watts per square meter-kelvins ("W/m²K"). For example, the material may exhibit a thermal admittance of about 1000 W/m²K or less, in some embodiments from about 10 to about 800 W/m²K, in some embodiments from about 20 to about 500 W/m²K, and in some embodiments, from about 40 to about 200 W/m²K. The actual thickness of the polymeric material may depend on its particular form, but typically ranges from about 5 micrometers to about 100 millimeters, in some embodiments from about 10 micrometers to about 50 millimeters, in some embodiments from about 200 micrometers to about 25 millimeters, and in some embodiments, from about 50 micrometers to about 5 millimeters.

To achieve such excellent thermal properties, the polymeric material of the present invention defines a porous network having a substantial portion of pores of a "nano-scale" size ("nanopores"), such as those having an average cross-sectional dimension of about 800 nanometers or less, in some embodiments from about 1 to about 500 nanometers, in some embodiments from about 5 to about 450 nanometers, in some embodiments from about 5 to about 400 nanometers, and in some embodiments, from about 10 to about 100 nanometers. The term "cross-sectional dimension" generally refers to a characteristic dimension (e.g., width or diameter) of a pore, which is substantially orthogonal to its major axis (e.g., length) and also typically substantially orthogonal to the direction of the stress applied during drawing. Such nanopores may, for example, constitute about 15 vol. % or more, in some embodiments about 20 vol. % or more, in some embodiments from about 30 vol. % to 100 vol. %, and in some embodiments, from about 40 vol. % to about 90 vol. % of the total pore volume in the polymeric material. Likewise, the material is highly porous in that the average percent volume occupied by the pores within a given unit volume of the material is typically from about 15% to about 80% per cm³, in some embodiments from about 20% to about 70%, and in some embodiments, from about 30% to about 60% per cubic centimeter of the material. In addition to enhancing thermal insulation properties, such a high void volume can also significantly lower the density of the material. For example, the composition may have a relatively low density, such as about 1.2 grams per cubic centimeter ("g/cm³") or less, in some embodiments about 1.0 g/cm³ or less, in some embodiments from about 0.2 g/cm³ to about 0.8 g/cm³, and in some embodiments, from about 0.1 g/cm³ to about 0.5 g/cm³. Due to its low density, lighter materials may be formed that still achieve good thermal resistance.

Contrary to conventional techniques for forming thermally insulating materials, the present inventors have discovered that the porous material of the present invention can be formed without the use of gaseous blowing agents. This is due in part to the unique nature of the components of the material, as well as the matter in which the material is formed. More particularly, the porous material may be formed from a thermoplastic composition containing a continuous phase that includes a matrix polymer, microinclusion additive, and nanoinclusion additive. The additives may be selected so that they have a different elastic modulus than the matrix polymer. In this manner, the microinclusion and nanoinclusion additives can become dispersed within the continuous phase as discrete micro-scale and nano-scale phase domains, respectively. The present inventors have discovered that the micro-scale and nano-scale phase domains are able to interact in a unique manner when subjected to a deformation and elongational strain (e.g., drawing) to create a network of pores, a substantial portion of which are of a nano-scale size. Namely, it is believed that elongational strain can initiate intensive localized shear zones and/or stress intensity zones (e.g., normal stresses) near the micro-scale discrete phase domains as a result of stress concentrations that arise from the incompatibility of the materials. These shear and/or stress intensity zones cause some initial debonding in the polymer matrix adjacent to the micro-scale domains. Notably, however, localized shear and/or stress intensity zones may also be created near the nano-scale discrete phase domains that overlap with the micro-scale zones. Such overlapping shear and/or stress intensity zones cause even further debonding to occur in the polymer matrix, thereby creating a substantial number of nanopores adjacent to the nano-scale domains and/or micro-scale domains.

Various embodiments of the present invention will now be described in more detail.

I. Thermoplastic Composition

A. Matrix Polymer

As indicated above, the thermoplastic composition contains a continuous phase within which the microinclusion and nanoinclusion additives are dispersed. The continuous phase contains one or more matrix polymers, which typically constitute from about 60 wt. % to about 99 wt. %, in some embodiments from about 75 wt. % to about 98 wt. %, and in some embodiments, from about 80 wt. % to about 95 wt. % of the thermoplastic composition. The nature of the matrix polymer(s) used to form the continuous phase is not critical and any suitable polymer may generally be employed, such as polyesters, polyolefins, styrenic polymers, polyamides, etc. In certain embodiments, for example, polyesters may be employed in the composition to form the polymer matrix. Any of a variety of polyesters may generally be employed, such as aliphatic polyesters, such as polycaprolactone, polyesteramides, polylactic acid (PLA) and its copolymers, polyglycolic acid, polyalkylene carbonates (e.g., polyethylene carbonate), poly-3-hydroxybutyrate (PHB), poly-3-hydroxyvalerate (PHV), poly-3-hydroxybutyrate-co-4-hydroxybutyrate, poly-3-hydroxybutyrate-co-3-hydroxyvalerate copolymers (PHBV), poly-3-hydroxybutyrate-co-3-hydroxyhexanoate, poly-3-hydroxybutyrate-co-3-hydroxyoctanoate, poly-3-hydroxybutyrate-co-3-hydroxydecanoate, poly-3-hydroxybutyrate-co-3-hydroxyoctadecanoate, and succinate-based aliphatic polymers (e.g., polybutylene succinate, polybutylene succinate adipate, polyethylene succinate, etc.); aliphatic-aromatic copolyesters (e.g., polybutylene adipate terephthalate, polyethylene adipate terephthalate, polyethylene adipate isophthalate, polybutylene adipate isophthalate, etc.); aromatic polyesters (e.g., polyethylene terephthalate, polybutylene terephthalate, etc.); and so forth.

In certain cases, the thermoplastic composition may contain at least one polyester that is rigid in nature and thus has a relatively high glass transition temperature. For example, the glass transition temperature ("$T_g$") may be about 0° C. or more, in some embodiments from about 5° C. to about 100° C., in some embodiments from about 30° C. to about 80° C., and in some embodiments, from about 50° C. to about 75° C. The polyester may also have a melting temperature of from about 140° C. to about 300° C., in some embodiments from about 150° C. to about 250° C., and in some embodiments, from about 160° C. to about 220° C. The melting temperature may be determined using differential scanning calorimetry ("DSC") in accordance with ASTM D-3417. The glass transition temperature may be determined by dynamic mechanical analysis in accordance with ASTM E1640-09.

One particularly suitable rigid polyester is polylactic acid, which may generally be derived from monomer units of any isomer of lactic acid, such as levorotory-lactic acid ("L-lactic acid"), dextrorotatory-lactic acid ("D-lactic acid"), meso-lactic acid, or mixtures thereof. Monomer units may also be formed from anhydrides of any isomer of lactic acid, including L-lactide, D-lactide, meso-lactide, or mixtures thereof. Cyclic dimers of such lactic acids and/or lactides may also be employed. Any known polymerization method, such as polycondensation or ring-opening polymerization, may be used to polymerize lactic acid. A small amount of a chain-extending agent (e.g., a diisocyanate compound, an epoxy compound or an acid anhydride) may also be employed. The polylactic acid may be a homopolymer or a copolymer, such as one that contains monomer units derived from L-lactic acid and monomer units derived from D-lactic acid. Although not required, the rate of content of one of the monomer unit derived from L-lactic acid and the monomer unit derived from D-lactic acid is preferably about 85 mole % or more, in some embodiments about 90 mole % or more, and in some embodiments, about 95 mole % or more. Multiple polylactic acids, each having a different ratio between the monomer unit derived from L-lactic acid and the monomer unit derived from D-lactic acid, may be blended at an arbitrary percentage. Of course, polylactic acid may also be blended with other types of polymers (e.g., polyolefins, polyesters, etc.).

In one particular embodiment, the polylactic acid has the following general structure:

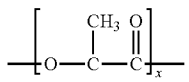

One specific example of a suitable polylactic acid polymer that may be used in the present invention is commercially available from Biomer, Inc. of Krailling, Germany) under the name BIOMER™ L9000. Other suitable polylactic acid polymers are commercially available from Natureworks LLC of Minnetonka, Minn. (NATUREWORKS®) or Mitsui Chemical (LACEA™). Still other suitable polylactic acids may be described in U.S. Pat. Nos. 4,797,468; 5,470,944; 5,770,682; 5,821,327; 5,880,254; and 6,326,458.

The polylactic acid typically has a number average molecular weight ("$M_n$") ranging from about 40,000 to about 180,000 grams per mole, in some embodiments from about 50,000 to about 160,000 grams per mole, and in some embodiments, from about 80,000 to about 120,000 grams per mole. Likewise, the polymer also typically has a weight average molecular weight ("$M_w$") ranging from about 80,000 to about 250,000 grams per mole, in some embodiments from about 100,000 to about 200,000 grams per mole, and in some embodiments, from about 110,000 to about 160,000 grams per mole. The ratio of the weight average molecular weight to the number average molecular weight ("$M_w/M_n$"), i.e., the "polydispersity index", is also relatively low. For example, the polydispersity index typically ranges from about 1.0 to about 3.0, in some embodiments from about 1.1 to about 2.0, and in some embodiments, from about 1.2 to about 1.8. The weight and number average molecular weights may be determined by methods known to those skilled in the art.

The polylactic acid may also have an apparent viscosity of from about 50 to about 600 Pascal seconds (Pa·s), in some embodiments from about 100 to about 500 Pa·s, and in some embodiments, from about 200 to about 400 Pa·s, as determined at a temperature of 190° C. and a shear rate of 1000 sec$^{-1}$. The melt flow rate of the polylactic acid (on a dry basis) may also range from about 0.1 to about 40 grams per 10 minutes, in some embodiments from about 0.5 to about 20 grams per 10 minutes, and in some embodiments, from about 5 to about 15 grams per 10 minutes, determined at a load of 2160 grams and at 190° C.

Some types of neat polyesters (e.g., polylactic acid) can absorb water from the ambient environment such that it has a moisture content of about 500 to 600 parts per million ("ppm"), or even greater, based on the dry weight of the starting polylactic acid. Moisture content may be determined in a variety of ways as is known in the art, such as in accordance with ASTM D 7191-05, such as described below. Because the presence of water during melt processing can hydrolytically degrade the polyester and reduce its molecular weight, it is sometimes desired to dry the polyester prior to blending. In most embodiments, for example, it is desired that the polyester have a moisture content of about 300 parts per million ("ppm") or less, in some embodiments about 200 ppm or less, in some embodiments from about 1 to about 100 ppm prior to blending with the microinclusion and nanoinclusion additives. Drying of the polyester may occur, for instance, at a temperature of from about 50° C. to about 100° C., and in some embodiments, from about 70° C. to about 80° C.

B. Microinclusion Additive

As used herein, the term "microinclusion additive" generally refers to any amorphous, crystalline, or semi-crystalline material that is capable of being dispersed within the polymer matrix in the form of discrete domains of a micro-scale size. For example, prior to drawing, the domains may have an average cross-sectional dimension of from about 0.05 µm to about 30 µm, in some embodiments from about 0.1 µm to about 25 µm, in some embodiments from about 0.5 µm to about 20 µm, and in some embodiments from about 1 µm to about 10 µm. The term "cross-sectional dimension" generally refers to a characteristic dimension (e.g., width or diameter) of a domain, which is substantially orthogonal to its major axis (e.g., length) and also typically substantially orthogonal to the direction of the stress applied during drawing. While typically formed from the microinclusion additive, it should be also understood that the micro-scale domains may also be formed from a combination of the microinclusion and nanoinclusion additives and/or other components of the composition.

The microinclusion additive is generally polymeric in nature and possesses a relatively high molecular weight to help improve the melt strength and stability of the thermoplastic composition. Typically, the microinclusion polymer may be generally immiscible with the matrix polymer. In this manner, the additive can better become dispersed as discrete phase domains within a continuous phase of the matrix polymer. The discrete domains are capable of absorbing energy that arises from an external force, which increases the overall toughness and strength of the resulting material. The domains may have a variety of different shapes, such as elliptical, spherical, cylindrical, plate-like, tubular, etc. In one embodiment, for example, the domains have a substantially elliptical shape. The physical dimension of an individual domain is typically small enough to minimize the propagation of cracks through the polymeric material upon the application of an external stress, but large enough to initiate microscopic plastic deformation and allow for shear and/or stress intensity zones at and around particle inclusions.

While the polymers may be immiscible, the microinclusion additive may nevertheless be selected to have a solubility parameter that is relatively similar to that of the matrix polymer. This can improve the interfacial compatibility and physical interaction of the boundaries of the discrete and continuous phases, and thus reduces the likelihood that the composition will fracture. In this regard, the ratio of the solubility parameter for the matrix polymer to that of the additive is typically from about 0.5 to about 1.5, and in some embodiments, from about 0.8 to about 1.2. For example, the microinclusion additive may have a solubility parameter of from about 15 to about 30 MJoules$^{1/2}$/m$^{3/2}$, and in some embodiments, from about 18 to about 22 MJoules$^{1/2}$/m$^{3/2}$, while polylactic acid may have a solubility parameter of about 20.5 MJoules$^{1/2}$/m$^{3/2}$. The term "solubility parameter" as used herein refers to the "Hildebrand Solubility Parameter", which is the square root of the cohesive energy density and calculated according to the following equation:

$$\delta = \sqrt{((\Delta H_v - RT)/V_m)}$$

where:
 ΔHv=heat of vaporization
 R=Ideal Gas constant
 T=Temperature
 Vm=Molecular Volume The Hildebrand solubility parameters for many polymers are also available from the Solubility Handbook of Plastics, by Wyeych (2004), which is incorporated herein by reference.

The microinclusion additive may also have a certain melt flow rate (or viscosity) to ensure that the discrete domains and resulting pores can be adequately maintained. For example, if the melt flow rate of the additive is too high, it tends to flow and disperse uncontrollably through the continuous phase. This results in lamellar, plate-like domains or co-continuous phase structures that are difficult to maintain and also likely to prematurely fracture. Conversely, if the melt flow rate of the additive is too low, it tends to clump together and form very large elliptical domains, which are difficult to disperse during blending. This may cause uneven distribution of the additive through the entirety of the continuous phase. In this regard, the present inventors have discovered that the ratio of the melt flow rate of the microinclusion additive to the melt flow rate of the matrix polymer is typically from about 0.2 to about 8, in some embodiments from about 0.5 to about 6, and in some embodiments, from about 1 to about 5. The microinclusion additive may, for example, have a melt flow rate of from about 0.1 to about 250 grams per 10 minutes, in some embodiments from about 0.5 to about 200 grams per 10 minutes, and in some embodiments, from about 5 to about 150 grams per 10 minutes, determined at a load of 2160 grams and at 190° C.

In addition to the properties noted above, the mechanical characteristics of the microinclusion additive may also be selected to achieve the desired porous network. For example, when a blend of the matrix polymer and microinclusion additive is applied with an external force, stress concentrations (e.g., including normal or shear stresses) and shear and/or plastic yielding zones may be initiated at and around the discrete phase domains as a result of stress concentrations that arise from a difference in the elastic modulus of the additive and matrix polymer. Larger stress concentrations promote more intensive localized plastic flow at the domains, which allows them to become significantly elongated when stresses are imparted. These elongated domains can allow the composition to exhibit a more pliable and softer behavior than the matrix polymer, such as when it is a rigid polyester resin. To enhance the stress concentrations, the microinclusion additive may be selected to have a relatively low Young's modulus of elasticity in comparison to the matrix polymer. For example, the ratio of the modulus of elasticity of the matrix polymer to that of the additive is typically from about 1 to about 250, in some embodiments from about 2 to about 100, and in some embodiments, from about 2 to about 50. The modulus of elasticity of the microinclusion additive may, for instance, range from about 2 to about 1000 Megapascals (MPa), in some embodiments from about 5 to about 500 MPa, and in some embodiments, from about 10 to about 200 MPa. To the contrary, the modulus of elasticity of polylactic acid, for example, is typically from about 800 MPa to about 3000 MPa.

While a wide variety of microinclusion additives may be employed that have the properties identified above, particularly suitable examples of such additives may include synthetic polymers, such as polyolefins (e.g., polyethylene, polypropylene, polybutylene, etc.); styrenic copolymers (e.g., styrene-butadiene-styrene, styrene-isoprene-styrene, styrene-ethylene-propylene-styrene, styrene-ethylene-butadiene-styrene, etc.); polytetrafluoroethylenes; polyesters (e.g., recycled polyester, polyethylene terephthalate, etc.); polyvinyl acetates (e.g., poly(ethylene vinyl acetate), polyvinyl chloride acetate, etc.); polyvinyl alcohols (e.g., polyvinyl alcohol, poly(ethylene vinyl alcohol), etc.); polyvinyl butyrals; acrylic resins (e.g., polyacrylate, polymethylacrylate, polymethylmethacrylate, etc.); polyamides (e.g., nylon); polyvinyl chlorides; polyvinylidene chlorides; polystyrenes; polyurethanes; etc. Suitable polyolefins may, for instance, include ethylene polymers (e.g., low density polyethylene ("LDPE"), high density polyethylene ("HDPE"), linear low density polyethylene ("LLDPE"), etc.), propylene homopolymers (e.g., syndiotactic, atactic, isotactic, etc.), propylene copolymers, and so forth.

In one particular embodiment, the polymer is a propylene polymer, such as homopolypropylene or a copolymer of propylene. The propylene polymer may, for instance, be formed from a substantially isotactic polypropylene homopolymer or a copolymer containing equal to or less than about 10 wt. % of other monomer, i.e., at least about 90% by weight propylene. Such homopolymers may have a melting point of from about 160° C. to about 170° C.

In still another embodiment, the polyolefin may be a copolymer of ethylene or propylene with another α-olefin, such as a $C_3$-$C_{20}$ α-olefin or $C_3$-$C_{12}$ α-olefin. Specific examples of suitable α-olefins include 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are 1-butene, 1-hexene and 1-octene. The ethylene or propylene content of such copolymers may be from about 60 mole % to about 99 mole %, in some embodiments from about 80 mole % to about 98.5 mole %, and in some embodiments, from about 87 mole % to about 97.5 mole %. The α-olefin content may likewise range from about 1 mole % to about 40 mole %, in some embodiments from about 1.5 mole % to about 15 mole %, and in some embodiments, from about 2.5 mole % to about 13 mole %.

Exemplary olefin copolymers for use in the present invention include ethylene-based copolymers available under the designation EXACT™ from ExxonMobil Chemical Company of Houston, Tex. Other suitable ethylene copolymers are available under the designation ENGAGE™, AFFINITY™, DOWLEX™ (LLDPE) and ATTANE™ (ULDPE) from Dow Chemical Company of Midland, Mich. Other suitable ethylene polymers are described in U.S. Pat. No. 4,937,299 to Ewen et al.; U.S. Pat. No. 5,218,071 to Tsutsui et al.; U.S. Pat. No. 5,272,236 to Lai, et al.; and U.S. Pat. No. 5,278,272 to Lai, et al. Suitable propylene copolymers are also commercially available under the designations VISTAMAXX™ from ExxonMobil Chemical Co. of Houston, Tex.; FINA™ (e.g., 8573) from Atofina Chemicals of Feluy, Belgium; TAFMER™ available from Mitsui Petrochemical Industries; and VERSIFY™ available from Dow Chemical Co. of Midland, Mich. Suitable polypropylene homopolymers may likewise include Exxon Mobil 3155 polypropylene, Exxon Mobil Achieve™ resins, and Total M3661 PP resin. Other examples of suitable propylene polymers are described in U.S. Pat. No. 6,500,563 to Datta, et al.; U.S. Pat. No. 5,539,056 to Yang, et al.; and U.S. Pat. No. 5,596,052 to Resconi, et al.

Any of a variety of known techniques may generally be employed to form the olefin copolymers. For instance, olefin polymers may be formed using a free radical or a coordination catalyst (e.g., Ziegler-Natta). Preferably, the olefin polymer is formed from a single-site coordination catalyst, such as a metallocene catalyst. Such a catalyst system produces ethylene copolymers in which the comonomer is randomly distributed within a molecular chain and uniformly distributed across the different molecular weight fractions. Metallocene-catalyzed polyolefins are described, for instance, in U.S. Pat. No. 5,571,619 to McAlpin et al.; U.S. Pat. No. 5,322,728 to Davis et al.; U.S. Pat. No. 5,472,775 to Obijeski et al.; U.S. Pat. No. 5,272,236 to Lai et al.; and U.S. Pat. No. 6,090,325 to Wheat, et al. Examples of metallocene catalysts include bis(n-butylcyclopentadienyl)titanium dichloride, bis(n-butylcyclopentadienyl)zirconium dichloride, bis(cyclopentadienyl)scandium chloride, bis(indenyl)zirconium dichloride, bis(methylcyclopentadienyl)titanium dichloride, bis(methylcyclopentadienyl)zirconium dichloride, cobaltocene, cyclopentadienyltitanium trichloride, ferrocene, hafnocene dichloride, isopropyl(cyclopentadienyl,-1-flourenyl)zirconium dichloride, molybdocene dichloride, nickelocene, niobocene dichloride, ruthenocene, titanocene dichloride, zirconocene chloride hydride, zirconocene dichloride, and so forth. Polymers made using metallocene catalysts typically have a narrow molecular weight range. For instance, metallocene-catalyzed polymers may have polydispersity numbers ($M_w/M_n$) of below 4, controlled short chain branching distribution, and controlled isotacticity.

Regardless of the materials employed, the relative percentage of the microinclusion additive in the thermoplastic composition is selected to achieve the desired properties without significantly impacting the base properties of the composition. For example, the microinclusion additive is typically employed in an amount of from about 1 wt. % to about 30 wt. %, in some embodiments from about 2 wt. % to about 25 wt. %, and in some embodiments, from about 5 wt. % to about 20 wt. % of the thermoplastic composition, based on the weight of the continuous phase (matrix polymer(s)). The concentration of the microinclusion additive in the entire thermoplastic composition may likewise constitute from about 0.1 wt. % to about 30 wt. %, in some embodiments from about 0.5 wt. % to about 25 wt. %, and in some embodiments, from about 1 wt. % to about 20 wt. %.

C. Nanoinclusion Additive

As used herein, the term "nanoinclusion additive" generally refers to any amorphous, crystalline, or semi-crystalline material that is capable of being dispersed within the polymer matrix in the form of discrete domains of a nano-scale size. For example, prior to drawing, the domains may have an average cross-sectional dimension of from about 1 to about 500 nanometers, in some embodiments from about 2 to about 400 nanometers, and in some embodiments, from about 5 to about 300 nanometers. It should be also understood that the nano-scale domains may also be formed from a combination of the microinclusion and nanoinclusion additives and/or other components of the composition. The nanoinclusion additive is typically employed in an amount of from about 0.05 wt. % to about 20 wt. %, in some embodiments from about 0.1 wt. % to about 10 wt. %, and in some embodiments, from about 0.5 wt. % to about 5 wt. % of the thermoplastic composition, based on the weight of the continuous phase (matrix polymer(s)). The concentration of the nanoinclusion additive in the entire thermoplastic composition may likewise be from about 0.01 wt. % to about 15 wt. %, in some embodiments from about 0.05 wt. % to about 10 wt. %, and in some embodiments, from about 0.3 wt. % to about 6 wt. % of the thermoplastic composition.

The nanoinclusion additive may be polymeric in nature and possess a relatively high molecular weight to help improve the melt strength and stability of the thermoplastic composition. To enhance its ability to become dispersed into nano-scale domains, the nanoinclusion additive may also be selected from materials that are generally compatible with the matrix polymer and the microinclusion additive. This may be particularly useful when the matrix polymer or the microinclusion additive possesses a polar moiety, such as a polyester. One example such a nanoinclusion additive is a functionalized polyolefin. The polar component may, for example, be provided by one or more functional groups and the non-polar component may be provided by an olefin. The olefin component of the nanoinclusion additive may generally be formed from any linear or branched α-olefin monomer, oligomer, or polymer (including copolymers) derived from an olefin monomer, such as described above.

The functional group of the nanoinclusion additive may be any group, molecular segment and/or block that provides a polar component to the molecule and is not compatible with the matrix polymer. Examples of molecular segment and/or blocks not compatible with polyolefin may include acrylates, styrenics, polyesters, polyamides, etc. The functional group can have an ionic nature and comprise charged metal ions. Particularly suitable functional groups are maleic anhydride, maleic acid, fumaric acid, maleimide, maleic acid hydrazide, a reaction product of maleic anhydride and diamine, methylnadic anhydride, dichloromaleic anhydride, maleic acid amide, etc. Maleic anhydride modified polyolefins are particularly suitable for use in the present invention. Such modified polyolefins are typically formed by grafting maleic anhydride onto a polymeric backbone material. Such maleated polyolefins are available from E. I. du Pont de Nemours and Company under the designation Fusabond®, such as the P Series (chemically modified polypropylene), E Series (chemically modified polyethylene), C Series (chemically modified ethylene vinyl acetate), A Series (chemically modified ethylene acrylate copolymers or terpolymers), or N Series (chemically modified ethylene-propylene, ethylene-propylene diene monomer ("EPDM") or ethylene-octene).

Alternatively, maleated polyolefins are also available from Chemtura Corp. under the designation Polybond® and Eastman Chemical Company under the designation Eastman G series.

In certain embodiments, the nanoinclusion additive may also be reactive. One example of such a reactive nanoinclusion additive is a polyepoxide that contains, on average, at least two oxirane rings per molecule. Without intending to be limited by theory, it is believed that such polyepoxide molecules can induce reaction of the matrix polymer (e.g., polyester) under certain conditions, thereby improving its melt strength without significantly reducing glass transition temperature. The reaction may involve chain extension, side chain branching, grafting, copolymer formation, etc. Chain extension, for instance, may occur through a variety of different reaction pathways. For instance, the modifier may enable a nucleophilic ring-opening reaction via a carboxyl terminal group of a polyester (esterification) or via a hydroxyl group (etherification). Oxazoline side reactions may likewise occur to form esteramide moieties. Through such reactions, the molecular weight of the matrix polymer may be increased to counteract the degradation often observed during melt processing. While it may be desirable to induce a reaction with the matrix polymer as described above, the present inventors have discovered that too much of a reaction can lead to crosslinking between polymer backbones. If such crosslinking is allowed to proceed to a significant extent, the resulting polymer blend can become brittle and difficult to process into a material with the desired strength and elongation properties.

In this regard, the present inventors have discovered that polyepoxides having a relatively low epoxy functionality are particularly effective, which may be quantified by its "epoxy equivalent weight." The epoxy equivalent weight reflects the amount of resin that contains one molecule of an epoxy group, and it may be calculated by dividing the number average molecular weight of the modifier by the number of epoxy groups in the molecule. The polyepoxide of the present invention typically has a number average molecular weight from about 7,500 to about 250,000 grams per mole, in some embodiments from about 15,000 to about 150,000 grams per mole, and in some embodiments, from about 20,000 to 100,000 grams per mole, with a polydispersity index typically ranging from 2.5 to 7. The polyepoxide may contain less than 50, in some embodiments from 5 to 45, and in some embodiments, from 15 to 40 epoxy groups. In turn, the epoxy equivalent weight may be less than about 15,000 grams per mole, in some embodiments from about 200 to about 10,000 grams per mole, and in some embodiments, from about 500 to about 7,000 grams per mole.

The polyepoxide may be a linear or branched, homopolymer or copolymer (e.g., random, graft, block, etc.) containing terminal epoxy groups, skeletal oxirane units, and/or pendent epoxy groups. The monomers employed to form such polyepoxides may vary. In one particular embodiment, for example, the polyepoxide contains at least one epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate.

The polyepoxide typically has a relatively high molecular weight, as indicated above, so that it may not only result in chain extension, but also help to achieve the desired blend morphology. The resulting melt flow rate of the polymer is thus typically within a range of from about 10 to about 200 grams per 10 minutes, in some embodiments from about 40 to about 150 grams per 10 minutes, and in some embodiments, from about 60 to about 120 grams per 10 minutes, determined at a load of 2160 grams and at a temperature of 190° C.

If desired, additional monomers may also be employed in the polyepoxide to help achieve the desired molecular weight. Such monomers may vary and include, for example, ester monomers, (meth)acrylic monomers, olefin monomers, amide monomers, etc. In one particular embodiment, for example, the polyepoxide includes at least one linear or branched α-olefin monomer, such as those having from 2 to 20 carbon atoms and preferably from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin comonomers are ethylene and propylene.

Another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof.

In one particularly desirable embodiment of the present invention, the polyepoxide is a terpolymer formed from an epoxy-functional (meth)acrylic monomeric component, α-olefin monomeric component, and non-epoxy functional (meth)acrylic monomeric component. For example, the polyepoxide may be poly(ethylene-co-methylacrylate-co-glycidyl methacrylate), which has the following structure:

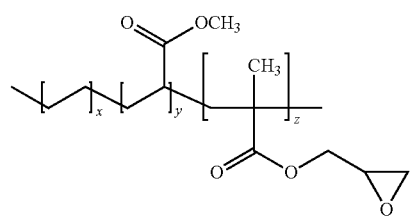

wherein, x, y, and z are 1 or greater.

The epoxy functional monomer may be formed into a polymer using a variety of known techniques. For example, a monomer containing polar functional groups may be grafted onto a polymer backbone to form a graft copolymer. Such grafting techniques are well known in the art and described, for instance, in U.S. Pat. No. 5,179,164. In other embodiments, a monomer containing epoxy functional groups may be copolymerized with a monomer to form a block or random copolymer using known free radical polymerization techniques, such as high pressure reactions, Ziegler-Natta catalyst reaction systems, single site catalyst (e.g., metallocene) reaction systems, etc.

The relative portion of the monomeric component(s) may be selected to achieve a balance between epoxy-reactivity and melt flow rate. More particularly, high epoxy monomer contents can result in good reactivity with the matrix polymer, but too high of a content may reduce the melt flow rate to such an extent that the polyepoxide adversely impacts the melt strength of the polymer blend. Thus, in most embodiments, the epoxy-functional (meth)acrylic monomer(s) constitute from about 1 wt. % to about 25 wt. %, in some embodiments from about 2 wt. % to about 20 wt. %, and in some embodiments, from about 4 wt. % to about 15 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer.

When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. One specific example of a suitable polyepoxide that may be used in the present invention is commercially available from Arkema under the name LOTADER® AX8950 or AX8900. LOTADER® AX8950, for instance, has a melt flow rate of 70 to 100 g/10 min and has a glycidyl methacrylate monomer content of 7 wt. % to 11 wt. %, a methyl acrylate monomer content of 13 wt. % to 17 wt. %, and an ethylene monomer content of 72 wt. % to 80 wt. %. Another suitable polyepoxide is commercially available from DuPont under the name ELVALOY® PTW, which is a terpolymer of ethylene, butyl acrylate, and glycidyl methacrylate and has a melt flow rate of 12 g/10 min.

In addition to controlling the type and relative content of the monomers used to form the polyepoxide, the overall weight percentage may also be controlled to achieve the desired benefits. For example, if the modification level is too low, the desired increase in melt strength and mechanical properties may not be achieved. The present inventors have also discovered, however, that if the modification level is too high, processing may be restricted due to strong molecular interactions (e.g., crosslinking) and physical network formation by the epoxy functional groups. Thus, the polyepoxide is typically employed in an amount of from about 0.05 wt. % to about 10 wt. %, in some embodiments from about 0.1 wt. % to about 8 wt. %, in some embodiments from about 0.5 wt. % to about 5 wt. %, and in some embodiments, from about 1 wt. % to about 3 wt. %, based on the weight of the matrix polymer employed in the composition. The polyepoxide may also constitute from about 0.05 wt. % to about 10 wt. %, in some embodiments from about 0.05 wt. % to about 8 wt. %, in some embodiments from about 0.1 wt. % to about 5 wt. %, and in some embodiments, from about 0.5 wt. % to about 3 wt. %, based on the total weight of the composition.

Other reactive nanoinclusion additives may also be employed in the present invention, such as oxazoline-functionalized polymers, cyanide-functionalized polymers, etc. When employed, such reactive nanoinclusion additives may be employed within the concentrations noted above for the polyepoxide. In one particular embodiment, an oxazoline-grafted polyolefin may be employed that is a polyolefin grafted with an oxazoline ring-containing monomer. The oxazoline may include a 2-oxazoline, such as 2-vinyl-2-oxazoline (e.g., 2-isopropenyl-2-oxazoline), 2-fatty-alkyl-2-oxazoline (e.g., obtainable from the ethanolamide of oleic acid, linoleic acid, palmitoleic acid, gadoleic acid, erucic acid and/or arachidonic acid) and combinations thereof. In another embodiment, the oxazoline may be selected from ricinoloxazoline maleinate, undecyl-2-oxazoline, soya-2-oxazoline, ricinus-2-oxazoline and combinations thereof, for example. In yet another embodiment, the oxazoline is selected from 2-isopropenyl-2-oxazoline, 2-isopropenyl-4,4-dimethyl-2-oxazoline and combinations thereof.

Nanofillers may also be employed, such as carbon black, carbon nanotubes, carbon nanofibers, nanoclays, metal nanoparticles, nanosilica, nanoalumina, etc. Nanoclays are particularly suitable. The term "nanoclay" generally refers to nanoparticles of a clay material (a naturally occurring mineral, an organically modified mineral, or a synthetic nanomaterial), which typically have a platelet structure. Examples of nanoclays include, for instance, montmorillonite (2:1 layered smectite clay structure), bentonite (aluminium phyllosilicate formed primarily of montmorillonite), kaolinite (1:1 aluminosilicate having a platy structure and empirical formula of $Al_2Si_2O_5(OH)_4$), halloysite (1:1 aluminosilicate having a tubular structure and empirical formula of $Al_2Si_2O_5(OH)_4$), etc. An example of a suitable nanoclay is Cloisite®, which is a montmorillonite nanoclay and commercially available from Southern Clay Products, Inc. Other examples of synthetic nanoclays include but are not limited to a mixed-metal hydroxide nanoclay, layered double hydroxide nanoclay (e.g., sepiocite), laponite, hectorite, saponite, indonite, etc.

If desired, the nanoclay may contain a surface treatment to help improve compatibility with the matrix polymer (e.g., polyester). The surface treatment may be organic or inorganic. In one embodiment, an organic surface treatment is employed that is obtained by reacting an organic cation with the clay. Suitable organic cations may include, for instance, organoquaternary ammonium compounds that are capable of exchanging cations with the clay, such as dimethyl bis [hydrogenated tallow]ammonium chloride (2M2HT), methyl benzyl bis[hydrogenated tallow]ammonium chloride (MB2HT), methyl tris[hydrogenated tallow alkyl]chloride (M3HT), etc. Examples of commercially available organic nanoclays may include, for instance, Dellite® 43B (Laviosa Chimica of Livomo, Italy), which is a montmorillonite clay modified with dimethyl benzylhydrogenated tallow ammonium salt. Other examples include Cloisite® 25A and Cloisite® 30B (Southern Clay Products) and Nanofil 919 (Süd Chemie). If desired, the nanofiller can be blended with a carrier resin to form a masterbatch that enhances the compatibility of the additive with the other polymers in the composition. Particularly suitable carrier resins include, for instance, polyesters (e.g., polylactic acid, polyethylene terephthalate, etc.); polyolefins (e.g., ethylene polymers, propylene polymers, etc.); and so forth, as described in more detail above.

In certain embodiments of the present invention, multiple nanoinclusion additives may be employed in combination. For instance, a first nanoinclusion additive (e.g., polyepoxide) may be dispersed in the form of domains having an average cross-sectional dimension of from about 50 to about 500 nanometers, in some embodiments from about 60 to about 400 nanometers, and in some embodiments from about 80 to about 300 nanometers. A second nanoinclusion additive (e.g., nanofiller) may also be dispersed in the form of domains that are smaller than the first nanoinclusive additive, such as those having an average cross-sectional dimension of from about 1 to about 50 nanometers, in some embodiments from about 2 to about 45 nanometers, and in some embodiments from about 5 to about 40 nanometers. When employed, the first and/or second nanoinclusion additives typically constitute from about 0.05 wt. % to about 20 wt. %, in some embodiments from about 0.1 wt. % to about 10 wt. %, and in some embodiments, from about 0.5 wt. % to about 5 wt. % of the thermoplastic composition, based on the weight of the continuous phase (matrix polymer(s)). The concentration of the first and/or second nanonclusion additives in the entire thermoplastic composition may likewise be from about 0.01 wt. % to about 15 wt. %, in some embodiments from about 0.05 wt. % to about 10 wt. %, and in some embodiments, from about 0.1 wt. % to about 8 wt. % of the thermoplastic composition.

D. Other Components

A wide variety of ingredients may be employed in the composition for a variety of different reasons. For instance, in one particular embodiment, an interphase modifier may be employed in the thermoplastic composition to help reduce the degree of friction and connectivity between the microinclusion additive and matrix polymer, and thus enhance the degree and uniformity of debonding. In this manner, the pores can become distributed in a more homogeneous fashion throughout the composition. The modifier may be in a liquid or semi-solid form at room temperature (e.g., 25° C.) so that it possesses a relatively low viscosity, allowing it to be more readily incorporated into the thermoplastic composition and to easily migrate to the polymer surfaces. In this regard, the kinematic viscosity of the interphase modifier is typically from about 0.7 to about 200 centistokes ("cs"), in some embodiments from about 1 to about 100 cs, and in some embodiments, from about 1.5 to about 80 cs, determined at 40° C. In addition, the interphase modifier is also typically hydrophobic so that it has an affinity for the microinclusion additive, for example, resulting in a change in the interfacial tension between the matrix polymer and the additive. By reducing physical forces at the interfaces between the matrix polymer and the microinclusion additive, it is believed that the low viscosity, hydrophobic nature of the modifier can help facilitate debonding. As used herein, the term "hydrophobic" typically refers to a material having a contact angle of water in air of about 40° or more, and in some cases, about 60° or more. In contrast, the term "hydrophilic" typically refers to a material having a contact angle of water in air of less than about 40°. One suitable test for measuring the contact angle is ASTM D5725-99 (2008).

Suitable hydrophobic, low viscosity interphase modifiers may include, for instance, silicones, silicone-polyether copolymers, aliphatic polyesters, aromatic polyesters, alkylene glycols (e.g., ethylene glycol, diethylene glycol, triethylene glycol, tetraethylene glycol, propylene glycol, polyethylene glycol, polypropylene glycol, polybutylene glycol, etc.), alkane diols (e.g., 1,3-propanediol, 2,2-dimethyl-1,3-propanediol, 1,3-butanediol, 1,4-butanediol, 1,5-pentanediol, 1,6-hexanediol, 2,2,4-trimethyl-1,6 hexanediol, 1,3-cyclohexanedimethanol, 1,4-cyclohexanedimethanol, 2,2,4,4-tetramethyl-1,3-cyclobutanediol, etc.), amine oxides (e.g., octyldimethylamine oxide), fatty acid esters, fatty acid amides (e.g., oleamide, erucamide, stearamide, ethylene bis(stearamide), etc.), mineral, and vegetable oils, and so forth. One particularly suitable liquid or semi-solid is polyether polyol, such as commercially available under the trade name Pluriol® WI from BASF Corp. Another suitable modifier is a partially renewable ester, such as commercially available under the trade name HALLGREEN® IM from Hallstar.

When employed, the interphase modifier may constitute from about 0.1 wt. % to about 20 wt. %, in some embodiments from about 0.5 wt. % to about 15 wt. %, and in some embodiments, from about 1 wt. % to about 10 wt. % of the thermoplastic composition, based on the weight of the continuous phase (matrix polymer(s)). The concentration of the interphase modifier in the entire thermoplastic composition may likewise constitute from about 0.05 wt. % to about 20 wt. %, in some embodiments from about 0.1 wt. % to about 15 wt. %, and in some embodiments, from about 0.5 wt. % to about 10 wt. %.

When employed in the amounts noted above, the interphase modifier has a character that enables it to readily migrate to the interfacial surface of the polymers and facilitate debonding without disrupting the overall melt properties of the thermoplastic composition. For example, the interphase modifier does not typically have a plasticizing effect on the polymer by reducing its glass transition temperature. Quite to the contrary, the present inventors have discovered that the glass transition temperature of the thermoplastic composition may be substantially the same as the initial matrix polymer. In this regard, the ratio of the glass temperature of the composition to that of the matrix polymer is typically from about 0.7 to about 1.3, in some embodiments from about 0.8 to about 1.2, and in some embodiments, from about 0.9 to about 1.1. The thermoplastic composition may, for example, have a glass transition temperature of from about 35° C. to about 80° C., in some embodiments from about 40° C. to about 80° C., and in some embodiments, from about 50° C. to about 65° C. The melt flow rate of the thermoplastic composition may also be similar to that of the matrix polymer. For example, the melt flow rate of the composition (on a dry basis) may be from about 0.1 to about 70 grams per 10 minutes, in some embodiments from about 0.5 to about 50 grams per 10 minutes, and in some embodiments, from about 5 to about 25 grams per 10 minutes, determined at a load of 2160 grams and at a temperature of 190° C.

Compatibilizers may also be employed that improve interfacial adhesion and reduce the interfacial tension between the domain and the matrix, thus allowing the formation of smaller domains during mixing. Examples of suitable compatibilizers may include, for instance, copolymers functionalized with epoxy or maleic anhydride chemical moieties. An example of a maleic anhydride compatibilizer is polypropylene-grafted-maleic anhydride, which is commercially available from Arkema under the trade names Orevac™ 18750 and Orevac™ CA 100. When employed, compatibilizers may constitute from about 0.05 wt. % to about 10 wt. %, in some embodiments from about 0.1 wt. % to about 8 wt. %, and in some embodiments, from about 0.5 wt. % to about 5 wt. % of the thermoplastic composition, based on the weight of the continuous phase matrix.

Other suitable materials that may also be used in the thermoplastic composition, such as catalysts, antioxidants, stabilizers, surfactants, waxes, solid solvents, fillers, nucleating agents (e.g., calcium carbonate, etc.), particulates, and other materials added to enhance the processability and mechanical properties of the thermoplastic composition. Nevertheless, one beneficial aspect of the present invention is that good properties may be provided without the need for various conventional additives, such as blowing agents (e.g., chlorofluorocarbons, hydrochlorofluorocarbons, hydrocarbons, carbon dioxide, supercritical carbon dioxide, nitrogen, etc.) and plasticizers (e.g., solid or semi-solid polyethylene glycol). In fact, the thermoplastic composition may be generally free of blowing agents and/or plasticizers. For example, blowing agents and/or plasticizers may be present in an amount of no more than about 1 wt. %, in some embodiments no more than about 0.5 wt. %, and in some embodiments, from about 0.001 wt. % to about 0.2 wt. % of the thermoplastic composition. Further, due to its stress whitening properties, as described in more detail below, the resulting composition may achieve an opaque color (e.g., white) without the need for conventional pigments, such as titanium dioxide. In certain embodiments, for example, pigments may be present in an amount of no more than about 1 wt. %, in some embodiments no more than about 0.5 wt. %, and in some embodiments, from about 0.001 wt. % to about 0.2 wt. % of the thermoplastic composition.

II. Polymeric Material

As indicated above, the polymeric material of the present invention is generally formed by drawing a thermoplastic composition that contains the matrix polymer, microinclusion additive, nanoinclusion additive, as well as other optional components. To form the initial thermoplastic composition, the components are typically blended together using any of a variety of known techniques. In one embodiment, for example, the components may be supplied separately or in combination. For instance, the components may first be dry mixed together to form an essentially homogeneous dry mixture, and they may likewise be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. Particularly suitable melt processing devices may be a co-rotating, twin-screw extruder (e.g., ZSK-30 extruder available from Werner & Pfleiderer Corporation of Ramsey, N.J. or a Thermo Prism™ USALAB 16 extruder available from Thermo Electron Corp., Stone, England). Such extruders may include feeding and venting ports and provide high intensity distributive and dispersive mixing. For example, the components may be fed to the same or different feeding ports of the twin-screw extruder and melt blended to form a substantially homogeneous melted mixture. If desired, other additives may also be injected into the polymer melt and/or separately fed into the extruder at a different point along its length.

Regardless of the particular processing technique chosen, the resulting melt blended composition typically contains micro-scale domains of the microinclusion additive and nano-scale domains of the nanoinclusion additive as described above. The degree of shear/pressure and heat may be controlled to ensure sufficient dispersion, but not so high as to adversely reduce the size of the domains so that they are incapable of achieving the desired properties. For example, blending typically occurs at a temperature of from about 180° C. to about 260° C., in some embodiments from about 185° C. to about 250° C., and in some embodiments, from about 190° C. to about 240° C. Likewise, the apparent shear rate during melt processing may range from about 10 seconds$^{-1}$ to about 3000 seconds$^{-1}$, in some embodiments from about 50 seconds$^{-1}$ to about 2000 seconds$^{-1}$, and in some embodiments, from about 100 seconds$^{-1}$ to about 1200 seconds$^{-1}$. The apparent shear rate may be equal to $4Q/\pi R^3$, where Q is the volumetric flow rate ("m$^3$/s") of the polymer melt and R is the radius ("m") of the capillary (e.g., extruder die) through which the melted polymer flows. Of course, other variables, such as the residence time during melt processing, which is inversely proportional to throughput rate, may also be controlled to achieve the desired degree of homogeneity.

To achieve the desired shear conditions (e.g., rate, residence time, shear rate, melt processing temperature, etc.), the speed of the extruder screw(s) may be selected with a certain range. Generally, an increase in product temperature is observed with increasing screw speed due to the additional mechanical energy input into the system. For example, the screw speed may range from about 50 to about 600 revolutions per minute ("rpm"), in some embodiments from about 70 to about 500 rpm, and in some embodiments, from about 100 to about 300 rpm. This may result in a temperature that is sufficient high to disperse the microinclusion additive without adversely impacting the size of the resulting domains. The melt shear rate, and in turn the degree to which the additives are dispersed, may also be increased through the use of one or more distributive and/or dispersive mixing elements within the mixing section of the extruder. Suitable distributive mixers for single screw extruders may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further improved by using pins in the barrel that create a folding and reorientation of the polymer melt, such as those used in Buss Kneader extruders, Cavity Transfer mixers, and Vortex Intermeshing Pin (VIP) mixers.

Once blended, the porous network structure is introduced by drawing the composition in the longitudinal direction (e.g., machine direction), transverse direction (e.g., cross-machine direction), etc., as well as combinations thereof. To perform the desired drawing, the thermoplastic composition may be formed into a precursor shape, drawn, and thereafter converted into the desired material (e.g., film, fiber, etc.). In one embodiment, the precursor shape may be a film having a thickness of from about 1 to about 5000 micrometers, in some embodiments from about 2 to about 4000 micrometers, in some embodiments from about 5 to about 2500 micrometers, and in some embodiments, from about 10 to about 500 micrometers. As an alternative to forming a precursor shape, the thermoplastic composition may also be drawn in situ as it is being shaped into the desired form for the polymeric material. In one embodiment, for example, the thermoplastic composition may be drawn as it is being formed into a film or fiber.

Regardless, various drawing techniques may be employed, such as aspiration (e.g., fiber draw units), tensile frame drawing, biaxial drawing, multi-axial drawing, profile drawing, vacuum drawing, etc. In one embodiment, for example, the composition is drawn with a machine direction orienter ("MDO"), such as commercially available from Marshall and Williams, Co. of Providence, R.I. MDO units typically have a plurality of drawing rolls (e.g., from 5 to 8) which progressively draw and thin the film in the machine direction. The composition may be drawn in either single or multiple discrete drawing operations. It should be noted that some of the rolls in an MDO apparatus may not be operating at progressively higher speeds. To draw the composition in the manner described above, it is typically desired that the rolls of the MDO are not heated. Nevertheless, if desired, one or more rolls may be heated to a slight extent to facilitate the drawing process so long as the temperature of the composition remains below the ranges noted above.

The degree of drawing depends in part of the nature of the material being drawn (e.g., fiber or film). The composition is typically drawn (e.g., in the machine direction) to a draw ratio of from about 1.1 to about 3.5, in some embodiments from about 1.2 to about 3.0, and in some embodiments, from about 1.3 to about 2.5. The draw ratio may be determined by dividing the length of the drawn material by its length before drawing. The draw rate may also vary to help achieve the desired properties, such as within the range of from about 5% to about 1500% per minute of deformation, in some embodiments from about 20% to about 1000% per minute of deformation, and in some embodiments, from about 25% to about 850% per minute of deformation. The composition is generally kept at a temperature below the glass temperature of the matrix polymer and/or microinclusion additive during drawing. Among other things, this helps to ensure that the polymer chains are not altered to such an extent that the porous network becomes unstable. For example, the composition may be drawn at a temperature that is at least about 10° C., in some embodiments at least about 20° C., and in some embodiments, at least about 30° C. below the glass transition temperature of the matrix polymer. For example, the composition may be drawn at a temperature of from about 0° C. to about 50° C., in some embodiments from about 15° C. to about 40° C., and in some embodiments, from about 20° C. to about 30° C. Although the composition is typically drawn without the application of external heat (e.g., heated rolls), such heat might be optionally employed to improve processability, reduce draw force, increase draw rates, and improve fiber uniformity.

Drawing in the manner described above can result in the formation of pores that have a "nano-scale" dimension ("nanopores"). For example, the nanopores may have an average cross-sectional dimension of about 800 nanometers or less, in some embodiments from about 1 to about 500 nanometers, in some embodiments from about 5 to about 450 nanometers, in some embodiments from about 5 to about 400 nanometers, and in some embodiments, from about 10 to about 100 nanometers. Micropores may also be formed at and around the micro-scale domains during drawing that have an average cross-sectional dimension of from about 0.5 to about 30 micrometers, in some embodiments from about 1 to about 20 micrometers, and in some embodiments, from about 2 micrometers to about 15 micrometers. The micropores and/or nanopores may have any regular or irregular shape, such as spherical, elongated, etc. In certain cases, the axial dimension of the micropores and/or nanopores may be larger than the cross-sectional dimension so that the aspect ratio (the ratio of the axial dimension to the cross-sectional dimension) is from about 1 to about 30, in some embodiments from about 1.1 to about 15, and in some embodiments, from about 1.2 to about 5. The "axial dimension" is the dimension in the direction of the major axis (e.g., length), which is typically in the direction of drawing.

The present inventors have also discovered that the pores (e.g., micropores, nanopores, or both) can be distributed in a substantially homogeneous fashion throughout the material. For example, the pores may be distributed in columns that are oriented in a direction generally perpendicular to the direction in which a stress is applied. These columns may be generally parallel to each other across the width of the material. Without intending to be limited by theory, it is believed that the presence of such a homogeneously distributed porous network can result in a high thermal resistance as well as good mechanical properties (e.g., energy dissipation under load and impact strength). This is in stark contrast to conventional techniques for creating pores that involve the use of blowing agents, which tend to result in an uncontrolled pore distribution and poor mechanical properties. Notably, the formation of the porous network by the process described above does not necessarily result in a substantial change in the cross-sectional size (e.g., width) of the material. In other words, the material is not substantially necked, which may allow the material to retain a greater degree of strength properties.

In addition to forming a porous network, drawing can also significantly increase the axial dimension of the micro-scale domains so that they have a generally linear, elongated shape. For example, the elongated micro-scale domains may have an average axial dimension that is about 10% or more, in some embodiments from about 20% to about 500%, and in some embodiments, from about 50% to about 250% greater than the axial dimension of the domains prior to drawing. The axial dimension after drawing may, for instance, range from about 0.5 to about 250 micrometers, in some embodiments from about 1 to about 100 micrometers, in some embodiments from about 2 to about 50 micrometers, and in some embodiments, from about 5 to about 25 micrometers. The micro-scale domains may also be relatively thin and thus have a small cross-sectional dimension. For instance, the cross-sectional dimension may be from about 0.05 to about 50 micrometers, in some embodiments from about 0.2 to about 10 micrometers, and in some embodiments, from 0.5 to about 5 micrometers. This may result in an aspect ratio for the micro-scale domains (the ratio of the axial dimension to the cross-sectional dimension) of from about 2 to about 150, in some embodiments from about 3 to about 100, and in some embodiments, from about 4 to about 50.

As a result of the porous and elongated domain structure, the present inventors have discovered that the resulting polymeric material can expand uniformly in volume when drawn in longitudinal direction, which is reflected by a low "Poisson coefficient", as determined according to the following equation:

$$\text{Poisson coefficient} = -E_{transverse}/E_{longitudinal}$$

where $E_{transverse}$ is the transverse deformation of the material and $E_{longitudinal}$ is the longitudinal deformation of the material. More particularly, the Poisson coefficient of the material can be approximately 0 or even negative. For example, the Poisson coefficient may be about 0.1 or less, in some embodiments about 0.08 or less, and in some embodiments, from about −0.1 to about 0.04. When the Poisson coefficient is zero, there is no contraction in transverse direction when the material is expanded in the longitudinal direction. When the Poisson coefficient is negative, the transverse or lateral dimensions of the material are also expanding when the material is drawn in the longitudinal direction. Materials having a negative Poisson coefficient can thus exhibit an increase in width when drawn in the longitudinal direction, which can result in increased energy absorption in the cross direction.

III. Thermal Insulation

The polymeric material of the present invention may generally have a variety of different forms depending on the particular application, such as films, fibrous materials, molded articles, profiles, etc., as well as composites and laminates thereof, for use in thermal insulation. In one embodiment, for example, the polymeric material is in the form of a film or layer of a film. Multilayer films may contain from two (2) to fifteen (15) layers, and in some embodiments, from three (3) to twelve (12) layers. Such multilayer films normally contain at least one base layer and at least one additional layer (e.g., skin layer), but may contain any number of layers desired. For example, the multilayer film may be formed from a base layer and one or more skin layers, wherein the base layer and/or skin layer(s) are formed from the polymeric material of the present invention. It should be understood, however, that other polymer materials may also be employed in the base layer and/or skin layer(s), such as polyolefin polymers.

The thickness of the film may be relatively small to increase flexibility. For example, the film may have a thickness of from about 1 to about 200 micrometers, in some embodiments from about 2 to about 150 micrometers, in some embodiments from about 5 to about 100 micrometers, and in some embodiments, from about 10 to about 60 micrometers. Despite having such a small thickness, the film may nevertheless be able to retain good mechanical properties during use. For example, the film may be relatively ductile. One parameter that is indicative of the ductility of the film is the percent elongation of the film at its break point, as determined by the stress strain curve, such as obtained in accordance with ASTM Standard D638-10 at 23° C. For example, the percent elongation at break of the film in the machine direction ("MD") may be about 10% or more, in some embodiments about 50% or more, in some embodiments about 80% or more, and in some embodiments, from about 100% to about 600%. Likewise, the percent elongation at break of the film in the cross-machine direction ("CD") may be about 15% or more, in some embodiments about 40% or more, in some embodiments about 70% or more, and in some embodiments, from about 100% to about 400%. Another parameter that is indicative of ductility is the tensile modulus of the film, which is equal to the ratio of the tensile stress to the tensile strain and is determined from the slope of a stress-strain curve. For example, the film typically exhibits a MD and/or CD tensile modulus of about 2500 Megapascals ("MPa") or less, in some embodiments about 2200 MPa or less, in some embodiments from about 50 MPa to about 2000 MPa, and in some embodiments, from about 100 MPa to about 1000 MPa. The tensile modulus may be determined in accordance with ASTM D638-10 at 23° C.

Although the film is ductile, it can still be relatively strong. One parameter that is indicative of the relative strength of the film is the ultimate tensile strength, which is equal to the peak stress obtained in a stress-strain curve, such as obtained in accordance with ASTM Standard D638-10. For example, the film may exhibit an MD and/or CD peak stress of from about 5 to about 65 MPa, in some embodiments from about 10 MPa to about 60 MPa, and in some embodiments, from about 20 MPa to about 55 MPa. The film may also exhibit an MD and/or CD break stress of from about 5 MPa to about 60 MPa, in some embodiments from about 10 MPa to about 50 MPa, and in some embodiments, from about 20 MPa to about 45 MPa. The peak stress and break stress may be determined in accordance with ASTM D638-10 at 23° C.

In addition to a film, the polymeric material may also be in the form of a fibrous material or a layer or component of a fibrous material, which can include individual staple fibers or filaments (continuous fibers), as well as yarns, fabrics, etc. formed from such fibers. Yarns may include, for instance, multiple staple fibers that are twisted together ("spun yarn"), filaments laid together without twist ("zero-twist yarn"), filaments laid together with a degree of twist, single filament with or without twist ("monofilament"), etc. The yarn may or may not be texturized. Suitable fabrics may likewise include, for instance, woven fabrics, knit fabrics, nonwoven fabrics (e.g., spunbond webs, meltblown webs, bonded carded webs, wet-laid webs, airlaid webs, coform webs, hydraulically entangled webs, etc.), and so forth.

Fibers formed from the thermoplastic composition may generally have any desired configuration, including monocomponent and multicomponent (e.g., sheath-core configuration, side-by-side configuration, segmented pie configuration, island-in-the-sea configuration, and so forth). In some embodiments, the fibers may contain one or more additional polymers as a component (e.g., bicomponent) or constituent (e.g., biconstituent) to further enhance strength and other mechanical properties. For instance, the thermoplastic composition may form a sheath component of a sheath/core bicomponent fiber, while an additional polymer may form the core component, or vice versa. The additional polymer may be a thermoplastic polymer such as polyesters, e.g., polylactic acid, polyethylene terephthalate, polybutylene terephthalate, and so forth; polyolefins, e.g., polyethylene, polypropylene, polybutylene, and so forth; polytetrafluoroethylene; polyvinyl acetate; polyvinyl chloride acetate; polyvinyl butyral; acrylic resins, e.g., polyacrylate, polymethylacrylate, polymethylmethacrylate, and so forth; polyamides, e.g., nylon; polyvinyl chloride; polyvinylidene chloride; polystyrene; polyvinyl alcohol; and polyurethanes.

When employed, the fibers can deform upon the application of strain, rather than fracture. The fibers may thus continue to function as a load bearing member even after the fiber has exhibited substantial elongation. In this regard, the fibers of the present invention are capable of exhibiting improved "peak elongation properties, i.e., the percent elongation of the fiber at its peak load. For example, the fibers of the present invention may exhibit a peak elongation of about 50% or more, in some embodiments about 100% or more, in some embodiments from about 200% to about 1500%, and in some embodiments, from about 400% to about 800%, such as determined in accordance with ASTM D638-10 at 23° C. Such elongations may be achieved for fibers having a wide variety of average diameters, such as those ranging from about 0.1 to about 50 micrometers, in some embodiments from about 1 to about 40 micrometers, in some embodiments from about 2 to about 25 micrometers, and in some embodiments, from about 5 to about 15 micrometers.

While possessing the ability to extend under strain, the fibers of the present invention can also remain relatively strong. For example, the fibers may exhibit a peak tensile stress of from about 25 to about 500 Megapascals ("MPa"), in some embodiments from about 50 to about 300 MPa, and in some embodiments, from about 60 to about 200 MPa, such as determined in accordance with ASTM D638-10 at 23° C. Another parameter that is indicative of the relative strength of the fibers of the present invention is "tenacity", which indicates the tensile strength of a fiber expressed as force per unit linear density. For example, the fibers of the present invention may have a tenacity of from about 0.75 to about 6.0 grams-force ("$g_f$") per denier, in some embodiments from about 1.0 to about 4.5 $g_f$ per denier, and in some embodiments, from about 1.5 to about 4.0 $g_f$ per denier. The denier of the fibers may vary depending on the desired application. Typically, the fibers are formed to have a denier per filament (i.e., the unit of linear density equal to the mass in grams per 9000 meters of fiber) of less than about 6, in some embodiments less than about 3, and in some embodiments, from about 0.5 to about 3.

If desired, the polymeric material of the present invention may be subjected to one or more additional processing steps, before and/or after being drawn. Examples of such processes include, for instance, groove roll drawing, embossing, coating, etc. In certain embodiments, the polymeric material may also be annealed to help ensure that it retains the desired shape. Annealing typically occurs at or above the glass transition temperature of the polymer matrix, such as at from about 40° to about 120° C., in some embodiments from about 50° C. to about 100° C., and in some embodiments, from about 70° C. to about 90° C. The polymeric material may also be surface treated using any of a variety of known techniques to improve its properties. For example, high energy beams (e.g., plasma, x-rays, e-beam, etc.) may be used to remove or reduce any skin layers, to change the surface polarity, porosity, topography, to embrittle a surface layer, etc. If desired, such surface treatment may be used before and/or drawing of the thermoplastic composition.

Regardless of its particular form, the polymeric material may be employed in a wide variety of types of insulation for thermal management of essentially any surface, or volume, whether enclosed fully or partially. Non-limiting examples include insulation materials for refrigeration units (e.g., refrigerators, freezers, vending machines, etc.); automotive components (e.g., front and rear seats, headrests, armrests, door panels, rear shelves/package trays, steering wheels and interior trim, dashboards, etc.); building panels and sections (e.g., roofs, wall cavities, under floors, etc.); apparel (e.g., coats, shirts, pants, gloves, aprons, coveralls, shoes, boots, headware, sock liners, etc.); furniture and bedding (e.g., sleeping bags, comforters, etc.); fluid storage/transfer systems (e.g., pipes or tankers for liquid/gas hydrocarbons, liquid nitrogen, oxygen, hydrogen, or crude oil); extreme environments (e.g., underwater or space); food and beverage products (e.g., cups, cup holders, plates, etc.); containers and bottles; and so forth.

Figure 2:
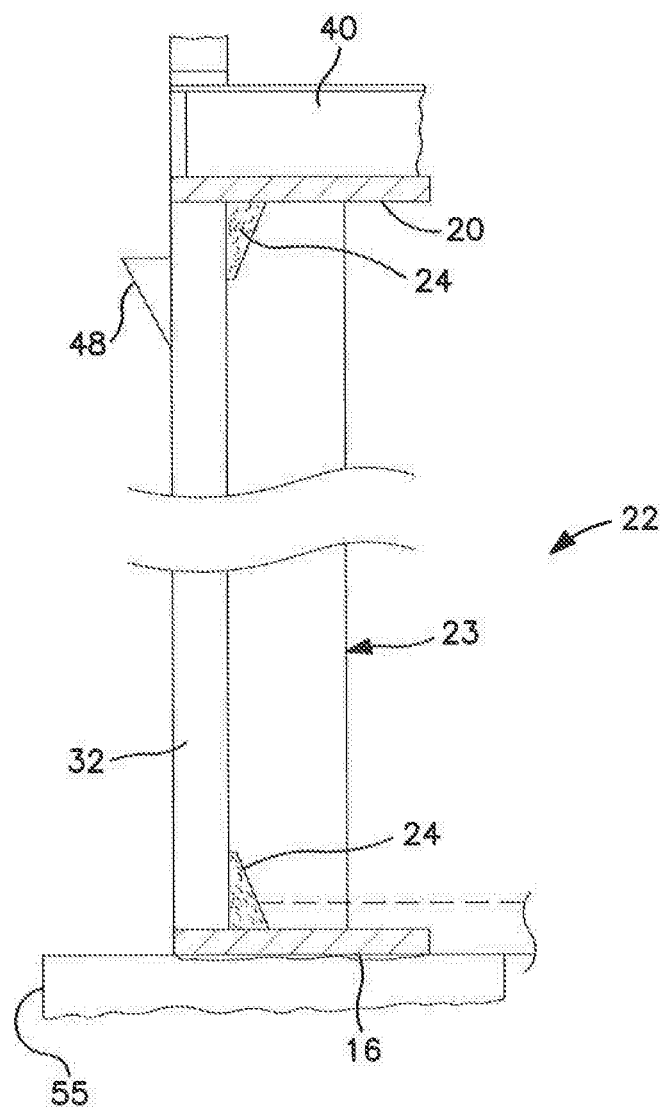
FIG. 2 is a cross-sectional of the building panel of FIG. 1 along a line 2-2.

Building panels, for example, may be formed from the polymeric material of the present invention and employed without limitation in the construction of foundation walls, frost walls (e.g., in buildings that have no basement), manufactured home base curtain walls, floor systems, ceiling systems, roof systems, exterior above-grade walls, curtain walls, exterior walls in areas that use masonry exteriors, etc. Referring to FIGS. 1-2, for instance, one embodiment of a building panel (e.g., foundation wall panel) that may be formed in accordance with the present invention is shown in more detail. As illustrated, a building contains interior and exterior foundation walls 10 that collectively define a foundation 12. Each foundation wall 10 is in turn defined by one or more foundation wall panels 14. In the illustration, each foundation wall panel 14 includes a bottom plate 16, an upstanding wall section 18, and a top plate 20. Each upstanding wall section 18 includes a main-run wall section 22 and uprightly-oriented reinforcing studs 23 affixed to, or integral with, the main-run wall section, regularly spaced along the length of the wall section, and extending inwardly of the inner surface of the main run wall section. In the embodiment illustrated in FIG. 1, anchoring wedge-shaped brackets 24 are mounted to the studs at the tops and bottoms of the wall section to assist in anchoring the bottom plate and the top plate, and/or any other attachment, to the main run portion of the upstanding wall section.

As illustrated, conventional beams 26 (e.g., steel I-beams) are mounted to the wall sections, as needed, to support spans of overlying floors. Such beams can be supported as needed by posts 28 and/or pads 30. Additional support posts can also be employed at or adjacent the ends of the beams to satisfy specific, individual load-bearing requirements of the building design. Solid reinforcing studs 23 can be used to attach the beams to respective panels of the foundation wall. As shown in FIG. 2, a main run wall section 22 is generally defined between the inner surface and the outer surface of the wall panel 14. In accordance with one embodiment of the present invention, the wall section 22 may include the polymeric material of the present invention as thermal insulation 32, which provides a thermal barrier between the inwardly-facing surface of the wall and the outwardly-facing surface of the wall. Bottom plate 16 and top plate 20 can be secured to the main run section 22 with the support of wedge-shaped brackets 24 or other supporting bracket structure. The bottom plate 16 may support the foundation wall and overlying building superstructure from an underlying fabricated base, such as a concrete footer 55.

Figure 3:
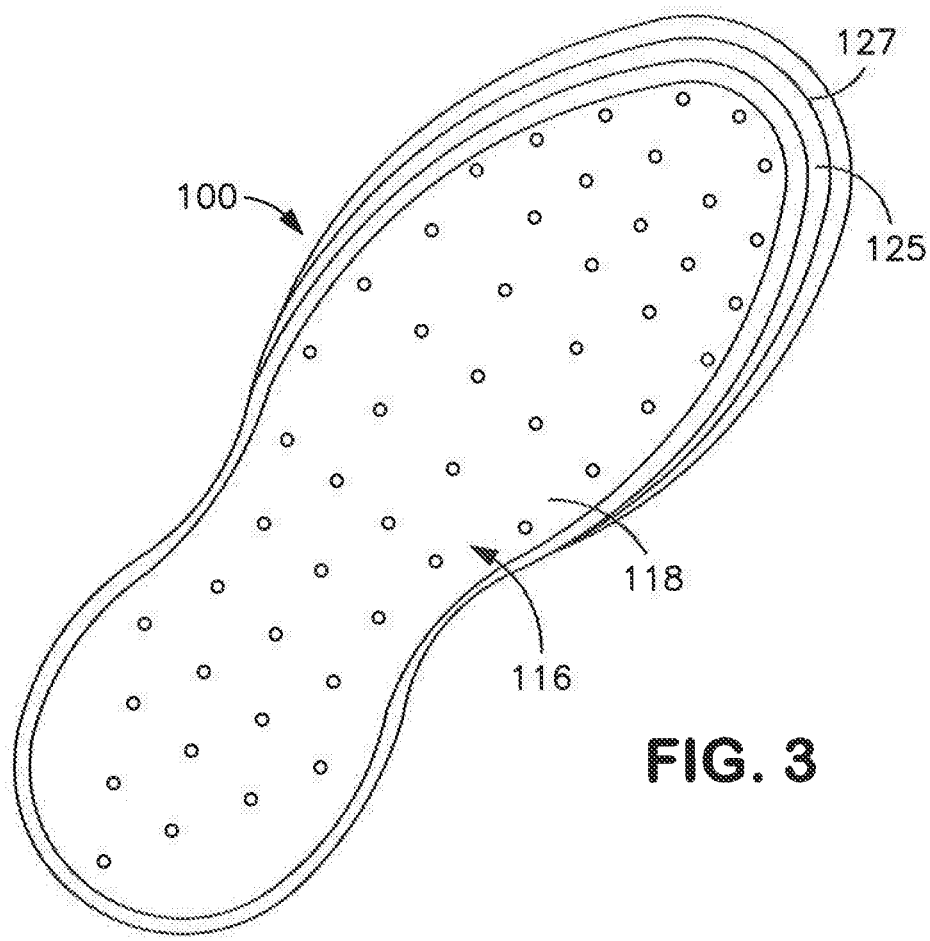
FIG. 3 is a top view of a liner for a shoe that may be formed in accordance with the present invention.
Figure 4:
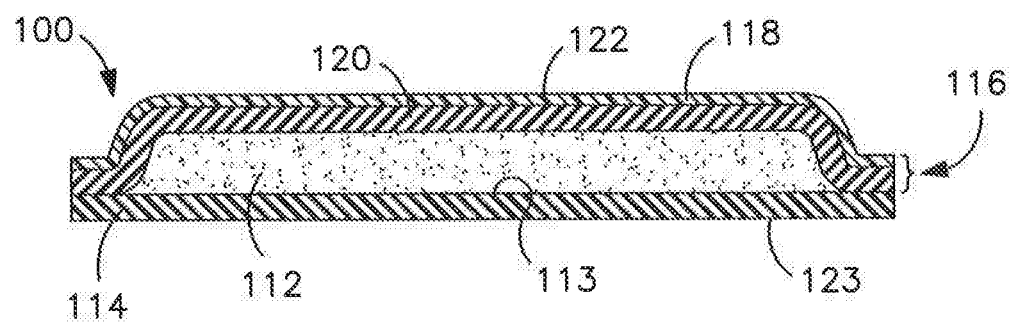
FIG. 4 is a cross-sectional view of the shoe liner of FIG. 3.

In yet other embodiments of the present invention, the polymeric material of the present invention may be used in apparel, such as in footwear or garments. The polymeric material may be used to form the apparel itself or simply as a liner. Referring to FIGS. 3-4, for example, one embodiment of a thermal liner 100 for a shoe is shown that may be formed from the polymeric material of the present invention. In this particular embodiment, the thermal liner 100 contains a thermal insulation layer 112, which may be formed form the polymeric material of the present invention, and which is encapsulated within support layers 114 and 116. Typically, the insulation layer 112 is die-cut and then disposed on an upper surface 113 of the first support layer 114. The thermal liner 100 is completed by disposing the second support layer 116, having a wearing material 118 laminated on an upper surface 122 of a polymeric material layer 120, over the insulation layer 112. The periphery of the first and second support layers 114 and 116 may be hermetically sealed by a high frequency or ultrasonic welder for encapsulating the insulation layer 112. The liner 100 may also include a frontal region 125, which includes the upper and lower support layers bonded together without any insulating material 112 therebetween. This frontal region includes raised contour ridges 127 having cut lines along which the liner 100 can be trimmed to fit various sized shoes. In yet other embodiments, the thermal liner 100 is formed entirely from the polymeric material of the present invention.

Figure 5:
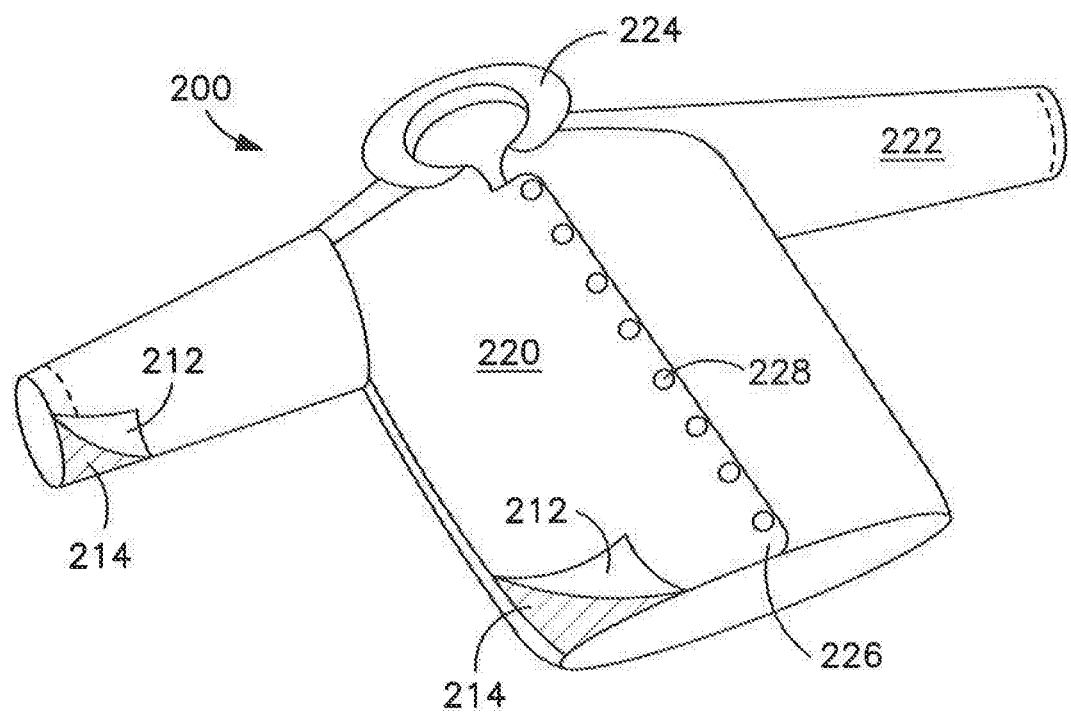
FIG. 5 is a perspective view of one embodiment of a liner for a coat that may be formed in accordance with the present invention.

Other types of apparel and thermal liners may also be formed in accordance with the present invention. Referring to FIG. 5, for instance, one embodiment of a garment 200 (i.e., coat) that includes a body portion 220, sleeves 222, and a collar 224 attached to the body portion. In this particular embodiment, the garment 200 is formed from a fabric 202 that is a laminate including an outer layer 212 and an inner layer 214, which defines a body-facing surface 225. The outer layer 212 also includes a front closure 226 that includes snaps 228, or alternatively a slide fastener (not shown). If desired, the outer layer 212 and/or the inner layer 214 may be formed from the polymeric material of the present invention. Nevertheless, in certain embodiments, the outer shell 212 may be from another material, such as nylon, polyester, cotton, or blends thereof. In yet other embodiments, the garment 200 is formed entirely from the polymeric material of the present invention.

The polymeric material may be utilized in forming thermal insulative materials in automotive applications. By way of example, fibers of the polymeric material may be beneficially employed in articles that can enhance comfort and/or aesthetics of a vehicle as well as provide a thermal barrier (e.g., coverings and/or paddings for sun visors, speaker housings and coverings, seat coverings, seal slip agents, and backings for seat coverings, carpeting and carpet reinforcement including carpet backing, car mats and backings for car mats, coverings for seat belts and seat belt anchorages, trunk floor coverings and liners, rear shelf panels, headliner facings and backings, upholstery backings, general decorative fabrics, etc.), as well as materials that can provide general temperature insulation (e.g., column padding, door trim pads, hood liners, general sound proofing and insulation materials, muffler wraps, bodywork parts, windows, saloon roofs, and sunroofs, tire reinforcements, etc.).

Utilization of the polymeric material is applicable to a wide variety of transportation applications, and is not intended to be in any way limited to the automotive industry. For instance, the polymeric material can be used in the transportation industry in any suitable application including, without limitation, air and space applications (e.g., airplanes, helicopters, space transports, military aerospace devices, etc.), marine applications (boats, ships, recreational vehicles), trains, and so forth.

The present invention may be better understood with reference to the following examples.

Test Methods

Conductive Properties:

Thermal conductivity (W/mK) and thermal resistance ($m^2K/W$) were determined in accordance with ASTM E-1530-11 ("Resistance to Thermal Transmission of Materials by the Guarded Heat Flow Meter Technique") using an Anter Unitherm Model 2022 tester. The target test temperature was 25° C. and the applied load was 0.17 MPa. Prior to testing, the samples were condition for 40+ hours at a temperature of 23° C. (±2° C.) and relative humidity of 50% (±0.10%). Thermal admittance ($W/m^2K$) was also calculated by dividing 1 by the thermal resistance.

Melt Flow Rate:

The melt flow rate ("MFR") is the weight of a polymer (in grams) forced through an extrusion rheometer orifice (0.0825-inch diameter) when subjected to a load of 2160 grams in 10 minutes, typically at 190° C., 210° C., or 230° C. Unless otherwise indicated, melt flow rate is measured in accordance with ASTM Test Method D1239 with a Tinius Olsen Extrusion Plastometer.

Thermal Properties:

The glass transition temperature ($T_g$) may be determined by dynamic mechanical analysis (DMA) in accordance with ASTM E1640-09. A Q800 instrument from TA Instruments may be used. The experimental runs may be executed in tension/tension geometry, in a temperature sweep mode in the range from −120° C. to 150° C. with a heating rate of 3° C./min. The strain amplitude frequency may be kept constant (2 Hz) during the test. Three (3) independent samples may be tested to get an average glass transition temperature, which is defined by the peak value of the tan δ curve, wherein tan δ is defined as the ratio of the loss modulus to the storage modulus (tan δ=E"/E').

The melting temperature may be determined by differential scanning calorimetry (DSC). The differential scanning calorimeter may be a DSC Q100 Differential Scanning Calorimeter, which may be outfitted with a liquid nitrogen cooling accessory and with a UNIVERSAL ANALYSIS 2000 (version 4.6.6) analysis software program, both of which are available from T.A. Instruments Inc. of New Castle, Del. To avoid directly handling the samples, tweezers or other tools may be used. The samples may be placed into an aluminum pan and weighed to an accuracy of 0.01 milligram on an analytical balance. A lid may be crimped over the material sample onto the pan. Typically, the resin pellets may be placed directly in the weighing pan.

The differential scanning calorimeter may be calibrated using an indium metal standard and a baseline correction may be performed, as described in the operating manual for the differential scanning calorimeter. A material sample may be placed into the test chamber of the differential scanning calorimeter for testing, and an empty pan may be used as a reference. All testing may be run with a 55-cubic centimeter per minute nitrogen (industrial grade) purge on the test chamber. For resin pellet samples, the heating and cooling program is a 2-cycle test that began with an equilibration of the chamber to −30° C., followed by a first heating period at a heating rate of 10° C. per minute to a temperature of 200° C., followed by equilibration of the sample at 200° C. for 3 minutes, followed by a first cooling period at a cooling rate of 10° C. per minute to a temperature of −30° C., followed by equilibration of the sample at −30° C. for 3 minutes, and then a second heating period at a heating rate of 10° C. per minute to a temperature of 200° C. For fiber samples, the heating and cooling program may be a 1-cycle test that begins with an equilibration of the chamber to −25° C., followed by a heating period at a heating rate of 10° C. per minute to a temperature of 200° C., followed by equilibration of the sample at 200° C. for 3 minutes, and then a cooling period at a cooling rate of 10° C. per minute to a temperature of −30° C. All testing may be run with a 55-cubic centimeter per minute nitrogen (industrial grade) purge on the test chamber.

The results may be evaluated using the UNIVERSAL ANALYSIS 2000 analysis software program, which identifies and quantifies the glass transition temperature ($T_g$) of inflection, the endothermic and exothermic peaks, and the areas under the peaks on the DSC plots. The glass transition temperature may be identified as the region on the plot-line where a distinct change in slope occurred, and the melting temperature may be determined using an automatic inflection calculation.

Film Tensile Properties:

Films may be tested for tensile properties (peak stress, modulus, strain at break, and energy per volume at break) on a MTS Synergie 200 tensile frame. The test may be performed in accordance with ASTM D638-10 (at about 23° C.). Film samples may be cut into dog bone shapes with a center width of 3.0 mm before testing. The dog-bone film samples may be held in place using grips on the MTS Synergie 200 device with a gauge length of 18.0 mm. The film samples may be stretched at a crosshead speed of 5.0 in/min until breakage occurred. Five samples may be tested for each film in both the machine direction (MD) and the cross direction (CD). A computer program (e.g., TestWorks 4) may be used to collect data during testing and to generate a stress versus strain curve from which a number of properties may be determined, including modulus, peak stress, elongation, and energy to break.

Fiber Tensile Properties:

Fiber tensile properties may be determined in accordance with ASTM 638-10 at 23° C. For instance, individual fiber specimens may initially be shortened (e.g., cut with scissors) to 38 millimeters in length, and placed separately on a black velvet cloth. 10 to 15 fiber specimens may be collected in this manner. The fiber specimens may then be mounted in a substantially straight condition on a rectangular paper frame having external dimension of 51 millimeters×51 millimeters and internal dimension of 25 millimeters×25 millimeters. The ends of each fiber specimen may be operatively attached to the frame by carefully securing the fiber ends to the sides of the frame with adhesive tape. Each fiber specimen may be measured for its external, relatively shorter, cross-fiber dimension employing a conventional laboratory microscope, which may be properly calibrated and set at 40× magnification. This cross-fiber dimension may be recorded as the diameter of the individual fiber specimen. The frame helps to mount the ends of the sample fiber specimens in the upper and lower grips of a constant rate of extension type tensile tester in a manner that avoids excessive damage to the fiber specimens.

A constant rate of extension type of tensile tester and an appropriate load cell may be employed for the testing. The load cell may be chosen (e.g., 10N) so that the test value falls within 10-90% of the full scale load. The tensile tester (i.e., MTS SYNERGY 200) and load cell may be obtained from MTS Systems Corporation of Eden Prairie, Mich. The fiber specimens in the frame assembly may then be mounted between the grips of the tensile tester such that the ends of the fibers may be operatively held by the grips of the tensile tester. Then, the sides of the paper frame that extend parallel to the fiber length may be cut or otherwise separated so that the tensile tester applies the test force only to the fibers. The fibers may be subjected to a pull test at a pull rate and grip speed of 12 inches per minute. The resulting data may be analyzed using a TESTWORKS 4 software program from the MTS Corporation with the following test settings:

| Calculation Inputs | | Test Inputs | |
|---|---|---|---|
| Break mark drop | 50% | Break sensitivity | 90% |
| Break marker elongation | 0.1 in | Break threshold | 10 $g_f$ |
| Nominal gage length | 1 in | Data Acq. Rate | 10 Hz |
| Slack pre-load | 1 $lb_f$ | Denier length | 9000 m |
| Slope segment length | 20% | Density | 1.25 g/cm$^3$ |
| Yield offset | 0.20% | Initial speed | 12 in/min |
| Yield segment length | 2% | Secondary speed | 2 in/min |

The tenacity values may be expressed in terms of gram-force per denier. Peak elongation (% strain at break) and peak stress may also be measured.

Expansion Ratio, Density, and Percent Pore Volume:

To determine expansion ratio, density, and percent pore volume, the width ($W_i$) and thickness ($T_i$) of the specimen may be initially measured prior to drawing. The length ($L_i$) before drawing may also be determined by measuring the distance between two markings on a surface of the specimen. Thereafter, the specimen may be drawn to initiate voiding. The width ($W_f$), thickness ($T_f$), and length ($L_f$) of the specimen may then be measured to the nearest 0.01 mm utilizing Digimatic Caliper (Mitutoyo Corporation). The volume ($V_i$) before drawing may be calculated by $W_i \times T_i \times L_i = V_i$. The volume ($V_f$) after drawing may also be calculated by $W_f \times T_f \times L_f = V_f$. The expansion ratio ($\phi$) may be calculated by $\phi = V_f/V_i$; the density ($P_f$) of was calculated by: $P_f = P_i/\phi$, where $P_i$ is density of precursor material; and the percent pore volume (% $V_v$) may be calculated by: % $V_v = (1-1/\phi) \times 100$.

Moisture Content:

Moisture content may be determined using an Arizona Instruments Computrac Vapor Pro moisture analyzer (Model No. 3100) in substantial accordance with ASTM D 7191-05, which is incorporated herein in its entirety by reference thereto for all purposes. The test temperature (§ X2.1.2) may be 130° C., the sample size (§ X2.1.1) may be 2 to 4 grams, and the vial purge time (§ X2.1.4) may be 30 seconds. Further, the ending criteria (§ X2.1.3) may be defined as a "prediction" mode, which means that the test is ended when the built-in programmed criteria (which mathematically calculates the end point moisture content) is satisfied.

Example 1

The ability to form a polymeric material for use in thermal insulation was demonstrated. Initially, a blend of 85.3 wt. % polylactic acid (PLA 6201 D, Natureworks®), 9.5 wt. % of a microinclusion additive, 1.4 wt. % of a nanoinclusion additive, and 3.8 wt. % of an interfacial modifier was demonstrated. The microinclusion additive was Vistamaxx™ 2120 (ExxonMobil), which is a polyolefin copolymer/elastomer with a melt flow rate of 29 g/10 min (190° C., 2160 g) and a density of 0.866 g/cm$^3$. The nanoinclusion additive was poly(ethylene-co-methyl acrylate-co-glycidyl methacrylate) (Lotader® AX8900, Arkema) having a melt flow rate of 5-6 g/10 min (190° C./2160 g), a glycidyl methacrylate content of 7 to 11 wt. %, methyl acrylate content of 13 to 17 wt. %, and ethylene content of 72 to 80 wt. %, the internal interfacial modifier was PLURIOL® WI 285 Lubricant from BASF which is a Polyalkylene Glycol Functional Fluids. The polymers were fed into a co-rotating, twin-screw extruder (ZSK-30, diameter of 30 mm, length of 1328 millimeters) for compounding that was manufactured by Werner and Pfleiderer Corporation of Ramsey, N.J. The extruder possessed 14 zones, numbered consecutively 1-14 from the feed hopper to the die. The first barrel zone #1 received the resins via gravimetric feeder at a total throughput of 15 pounds per hour. The PLURIOL® WI285 was added via injector pump into barrel zone #2. The die used to extrude the resin had 3 die openings (6 millimeters in diameter) that were separated by 4 millimeters. Upon formation, the extruded resin was cooled on a fan-cooled conveyor belt and formed into pellets by a Conair pelletizer. The extruder screw speed was 200 revolutions per minute ("rpm"). The pellets were then flood fed into a signal screw extruder heated to a temperature of 212° C. where the molten blend exited through 4.5 inch width slit die and drawn to a film thickness ranging from 0.54 to 0.58 mm.

Example 2

The sheet produced in Example 1 was cut to a 6" length and then drawn to 100% elongation using a MTS 820 hydraulic tensile frame in tensile mode at 50 mm/min.

Example 3

The sheet produced in Example 1 was cut to a 6" length and then drawn to 150% elongation using a MTS 820 hydraulic tensile frame in tensile mode at 50 mm/min.

Example 4

The sheet produced in Example 1 was cut to a 6" length and then drawn to 200% elongation using a MTS 820 hydraulic tensile frame in tensile mode at 50 mm/min.

The thermal properties of Examples 1-4 were then determined. The results are set forth in the table below.

| Example | Sample Thickness (mm) | Upper Surface Temp. (° C.) | Lower Surface Temp (° C.) | Heat Sink Temp (° C.) | Mean Sample Temp (° C.) | Thermal Resistance (m²K/W) | Thermal Admittance (W/m²K) | Thermal Conductivity (W/mK) |
|---|---|---|---|---|---|---|---|---|
| 1 | 0.58 | 40.5 | 30.0 | 11.3 | 35.3 | 0.0032 | 312.5 | 0.180 |
| 2 | 0.54 | 40.5 | 26.4 | 10.3 | 33.5 | 0.0054 | 185.2 | 0.100 |
| 3 | 0.57 | 40.5 | 26.1 | 10.3 | 33.3 | 0.0057 | 175.4 | 0.100 |
| 4 | 0.56 | 40.5 | 25.1 | 10.0 | 32.8 | 0.0064 | 156.3 | 0.087 |

Example 5

Pellets were formed as described in Example 1 and then flood fed into a Rheomix 252 single screw extruder with a L/D ratio of 25:1 and heated to a temperature of 212° C. where the molten blend exited through a Haake 6 inch width s cast film die and drawn to a film thickness ranging from 39.4 µm to 50.8 µm via Haake take-up roll. The film was drawn in the machine direction to a longitudinal deformation of 160% at a pull rate of 50 mm/min (deformation rate of 67%/min) via MTS Synergie 200 tensile frame with grips at a gage length of 75 mm.

Example 6

Films were formed as described in Example 5, except that the film was also stretched in the cross-machine direction to a deformation of 100% at a pull rate of 50 mm/min (deformation rate of 100%/min) with grips at a gage length of 50 mm.

Various properties of the films of Examples 5-6 were tested as described above. The results are set forth below in Tables 1-2.

TABLE 1

Film Properties

| Ex. | Average Thickness (µm) | Expansion Ratio (φ) | Percent Void Volume (% $V_v$) | Density (g/cm³) |
|---|---|---|---|---|
| 5 | 41.4 | 1.82 | 45 | 0.65 |
| 6 | 34.0 | 2.13 | 53 | 0.56 |

TABLE 2

Tensile Properties

| Example | Avg. Thickness (µm) | Avg. Modulus (MPa) | Avg. Yield Stress (MPa) | Avg. Break Stress (MPa) | Avg. Strain at Break (%) | Avg. Energy per Volume at Break (J/cm³) |
|---|---|---|---|---|---|---|
| 5 MD | 44.5 | 466 | 41.4 | 36.9 | 54.6 | 16.8 |
| CD | 40.4 | 501 | 15.9 | 15.9 | 62.6 | 9.4 |
| 6 MD | 37.3 | 265 | 26.7 | 26.3 | 85.5 | 15.8 |
| CD | 34.3 | 386 | 25.1 | 25.2 | 45.8 | 9.3 |

Example 7

Figure 6:
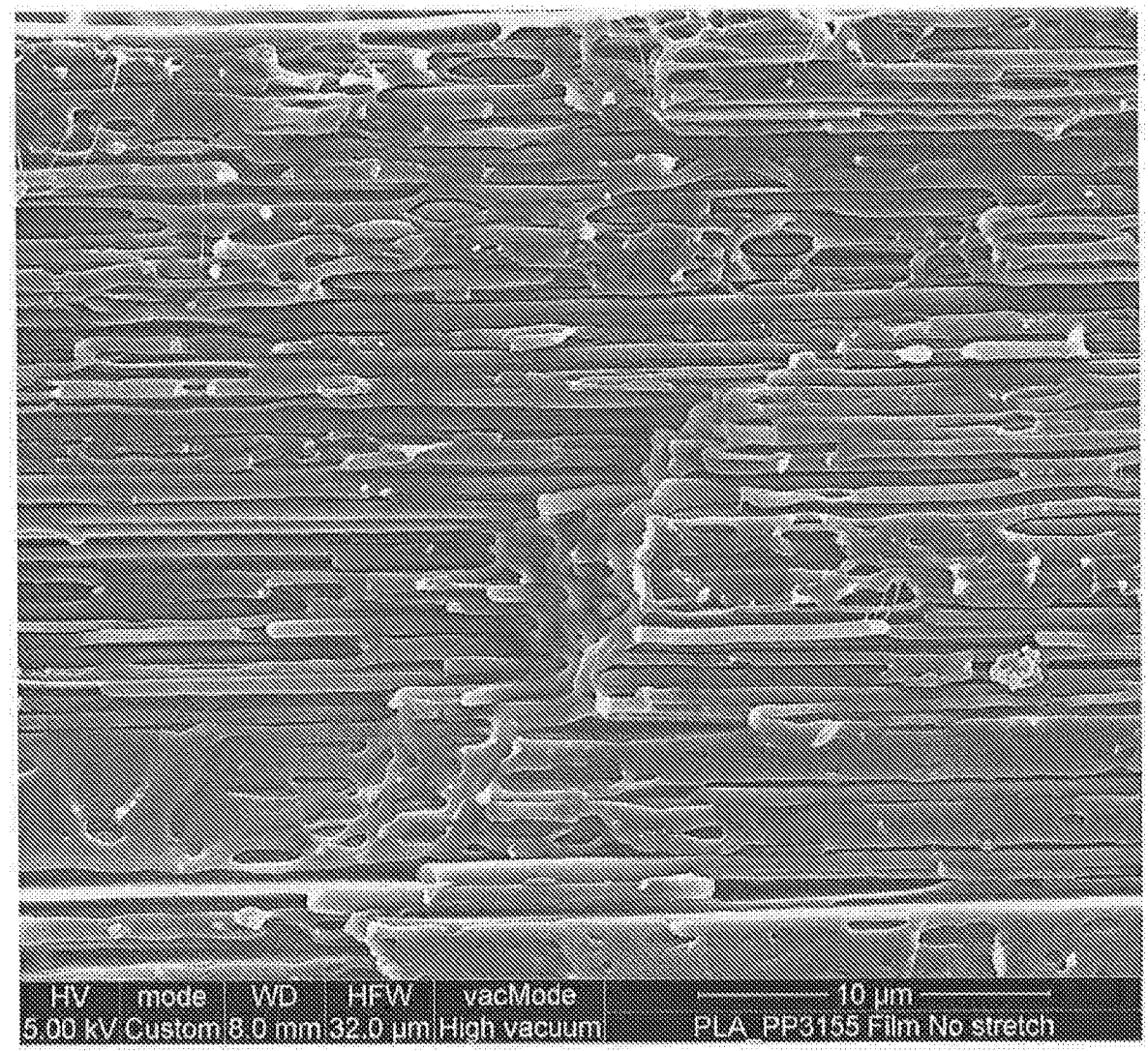
FIGS. 6-7 are SEM microphotographs of the unstretched film of Example 7 (film was cut parallel to machine direction orientation)
Figure 7:
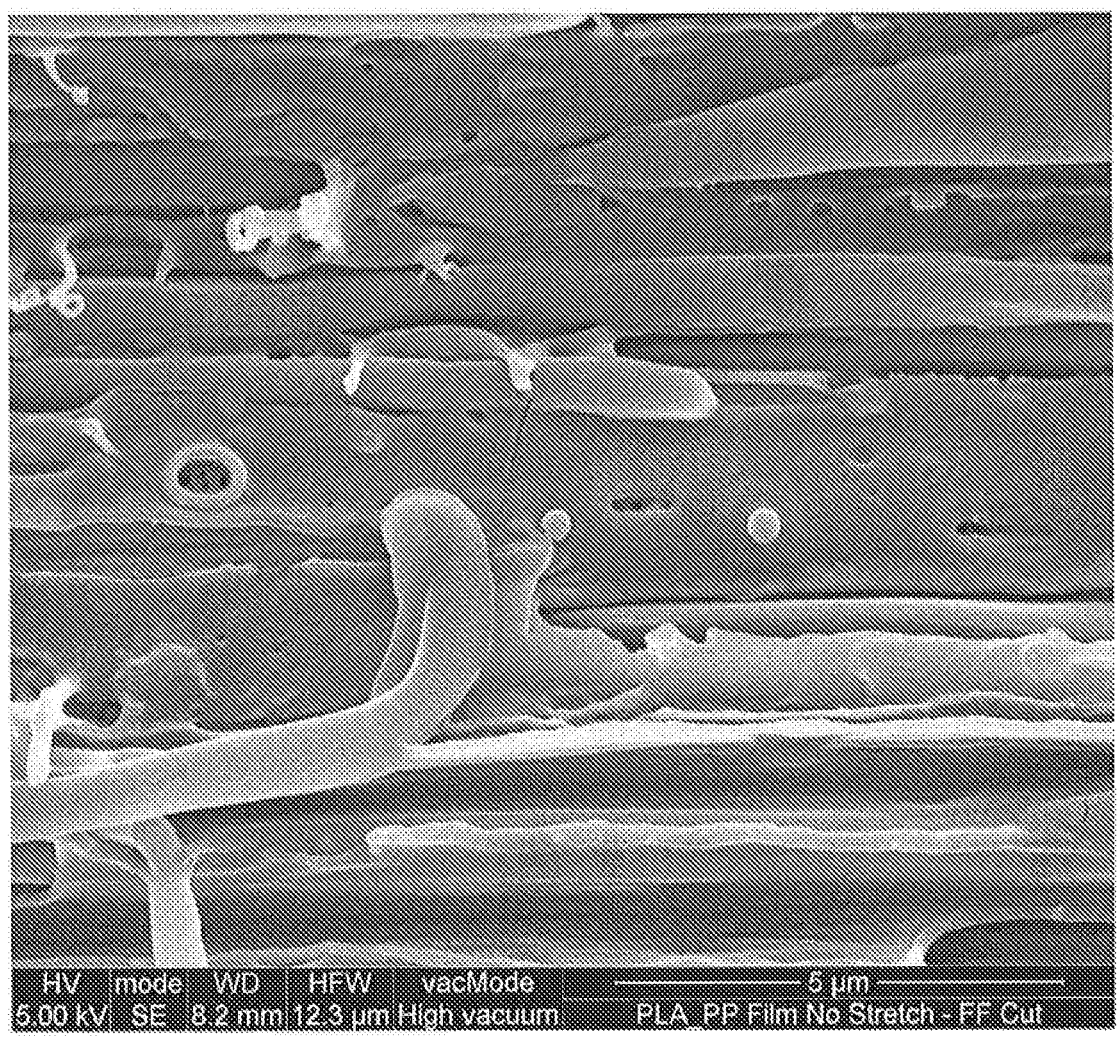
Figure 8:
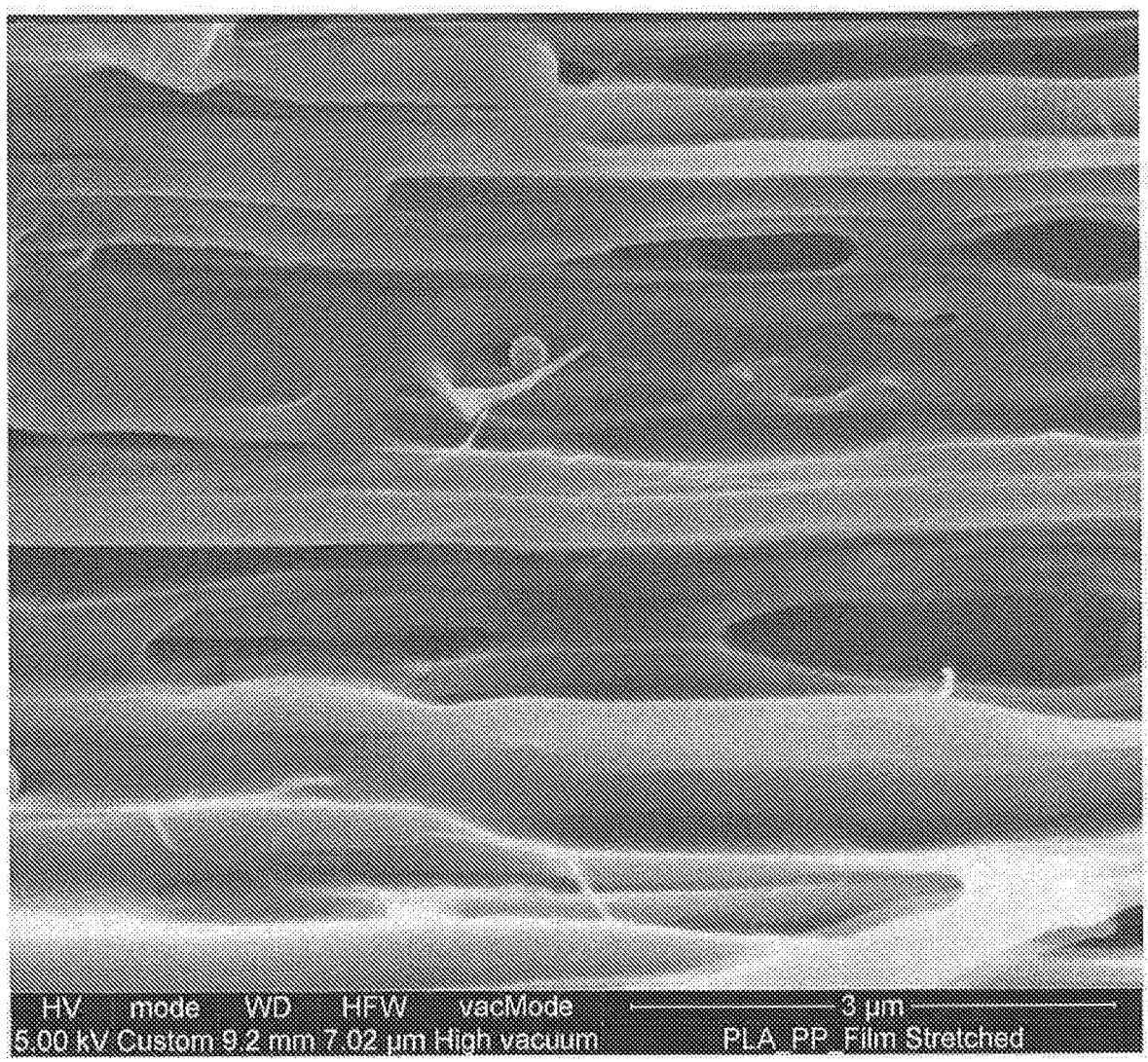
FIGS. 8-9 are SEM microphotographs of the stretched film of Example 7 (film was cut parallel to machine direction orientation)
Figure 9:
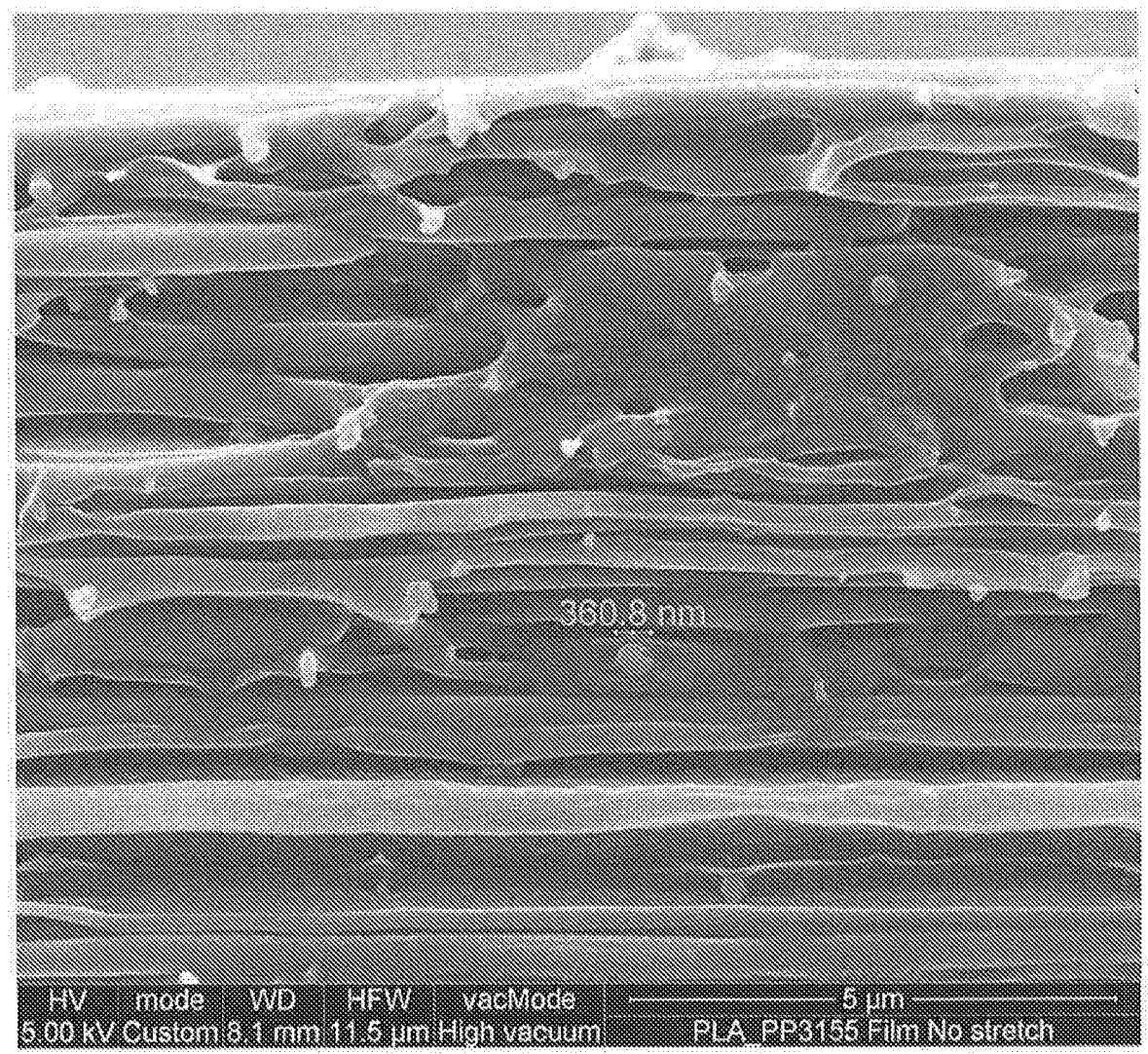

Pellets were formed as described in Example 1 and then flood fed into a signal screw extruder heated to a temperature of 212° C., where the molten blend exited through 4.5 inch width slit die and drawn to a film thickness ranging from 36 µm to 54 µm. The films were stretched in the machine direction to about 100% to initiate cavitation and void formation. The morphology of the films was analyzed by scanning electron microscopy (SEM) before and after stretching. The results are shown in FIGS. 6-9. As shown in FIGS. 6-7, the microinclusion additive was initially dispersed in domains having an axial size (in machine direction) of from about 2 to about 30 micrometers and a transverse dimension (in cross-machine direction) of from about 1 to about 3 micrometers, while the nanoinclusion additive was initially dispersed as spherical or spheroidal domains having an axial size of from about 100 to about 300 nanometers. FIGS. 8-9 show the film after stretching. As indicated, pores formed around the microinclusion and nanoinclusion additives. The micropores formed around the microinclusion additive generally had an elongated or slit-like shape with a broad size distribution ranging from about 2 to about 20 micrometers in the axial direction. The nanopores associated with the nanoinclusion additive generally had a size of from about 50 to about 500 nanometers.

Example 8

The compounded pellets of Example 7 were dry blended with another nanoinclusion additive, which was a halloisite clay masterbatch (MacroComp MNH-731-36, MacroM) containing 22 wt. % of a styrenic copolymer modified nanoclay and 78 wt. % polypropylene (Exxon Mobil 3155). The mixing ratio was 90 wt. % of the pellets and 10 wt. % of the clay masterbatch, which provided a total clay content of 2.2%. The dry blend was then flood fed into a signal screw extruder heated to a temperature of 212° C., where the molten blend exited through 4.5 inch width slit die and drawn to a film thickness ranging from 51 to 58 µm. The films were stretched in the machine direction to about 100% to initiate cavitation and void formation.

Figure 10:
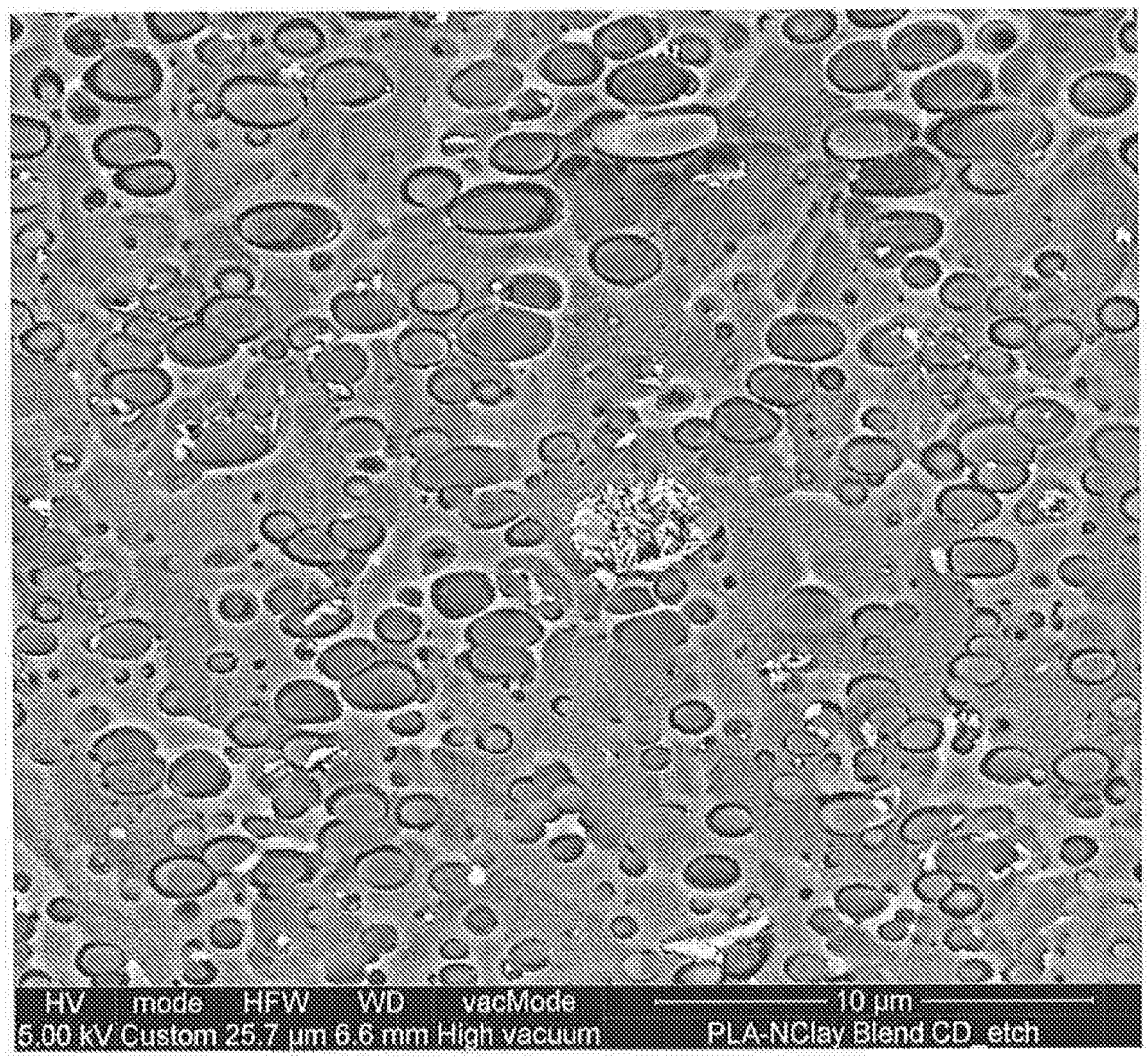
FIGS. 10-11 are SEM microphotographs of the unstretched film of Example 8, where the film was cut perpendicular to the machine direction in FIG. 10 and parallel to the machine direction in FIG. 11.
Figure 11:
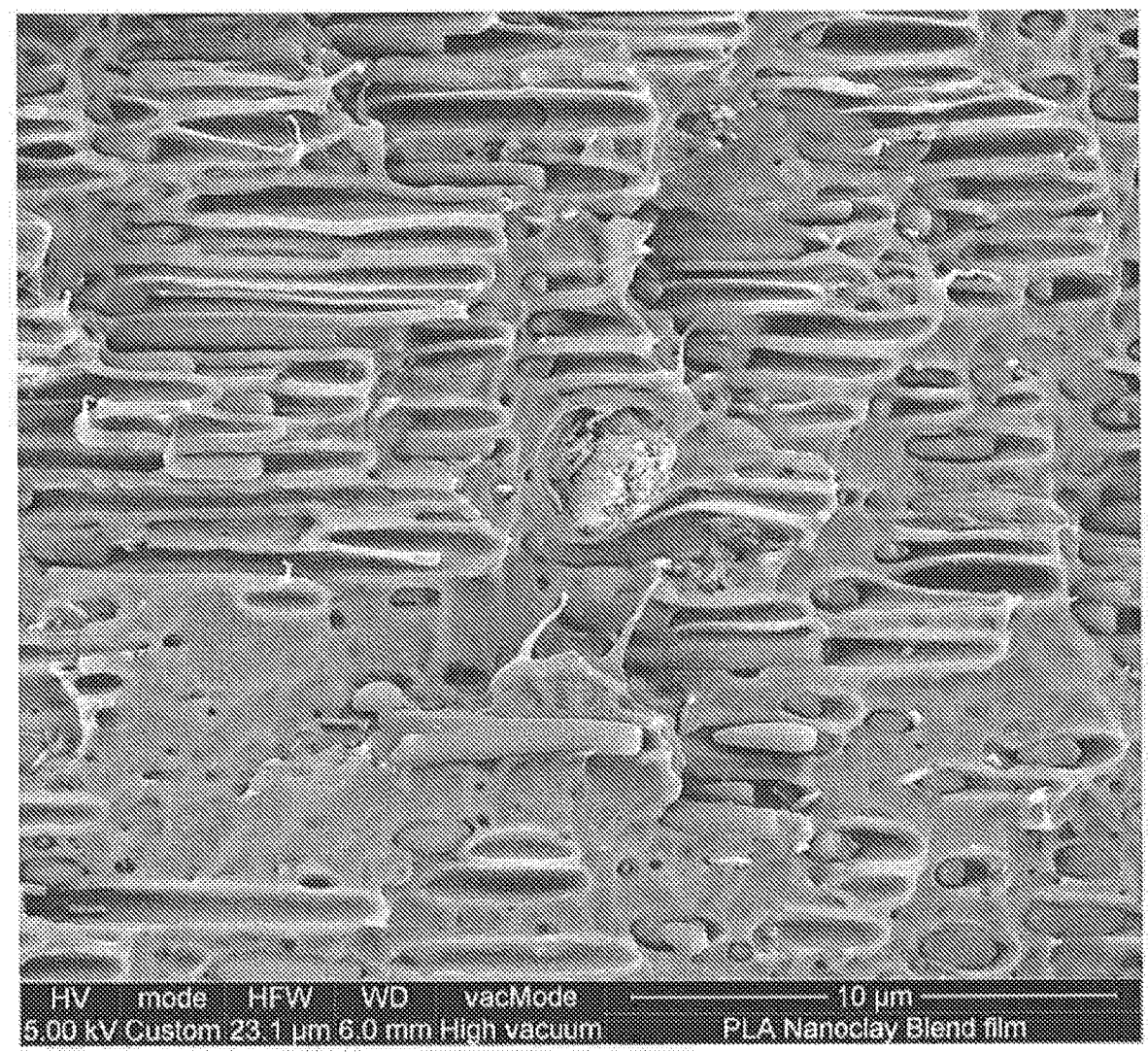
Figure 12:
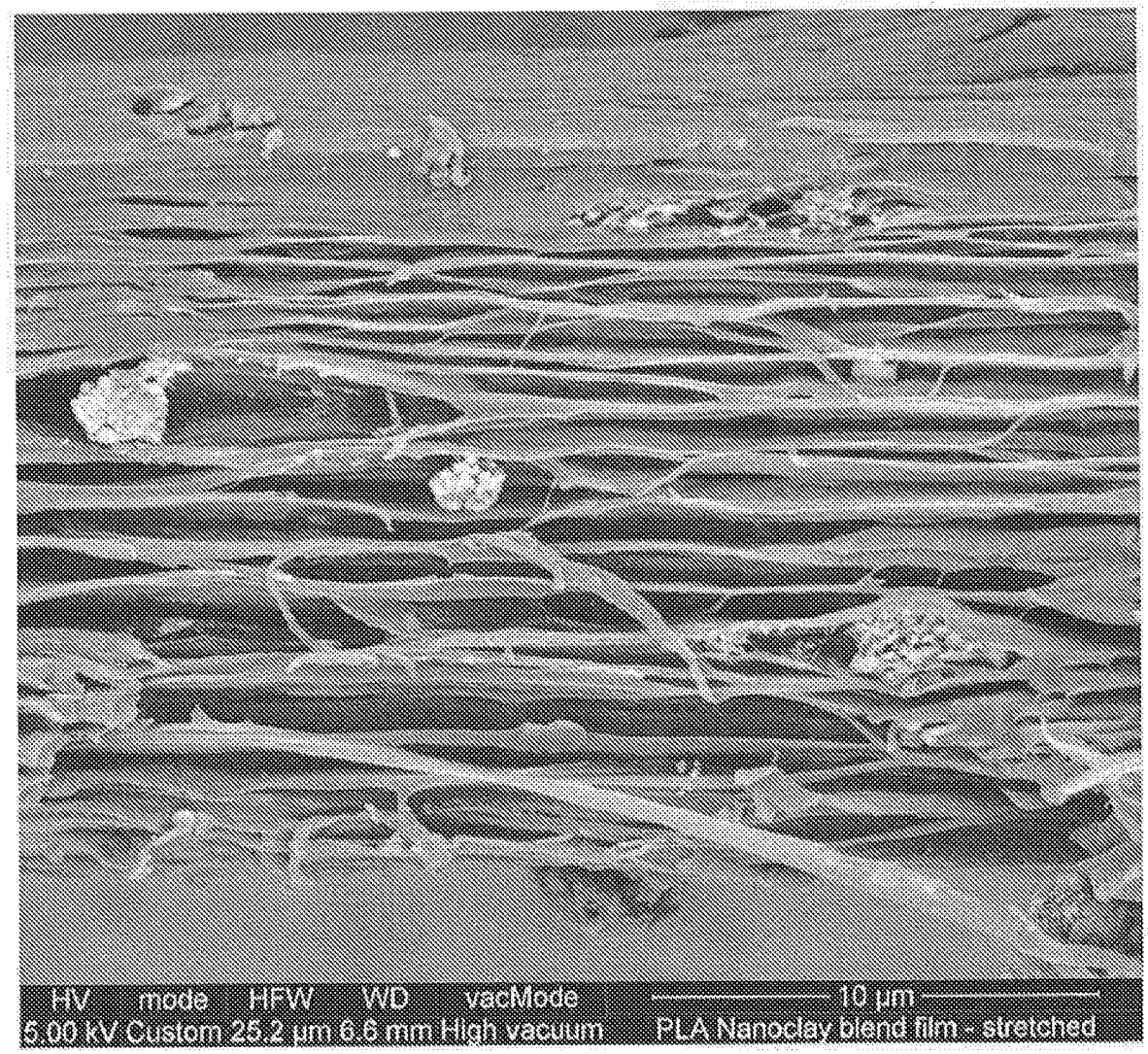
FIGS. 12-13 are SEM microphotographs of the stretched film of Example 8 (film was cut parallel to machine direction orientation)
Figure 13:
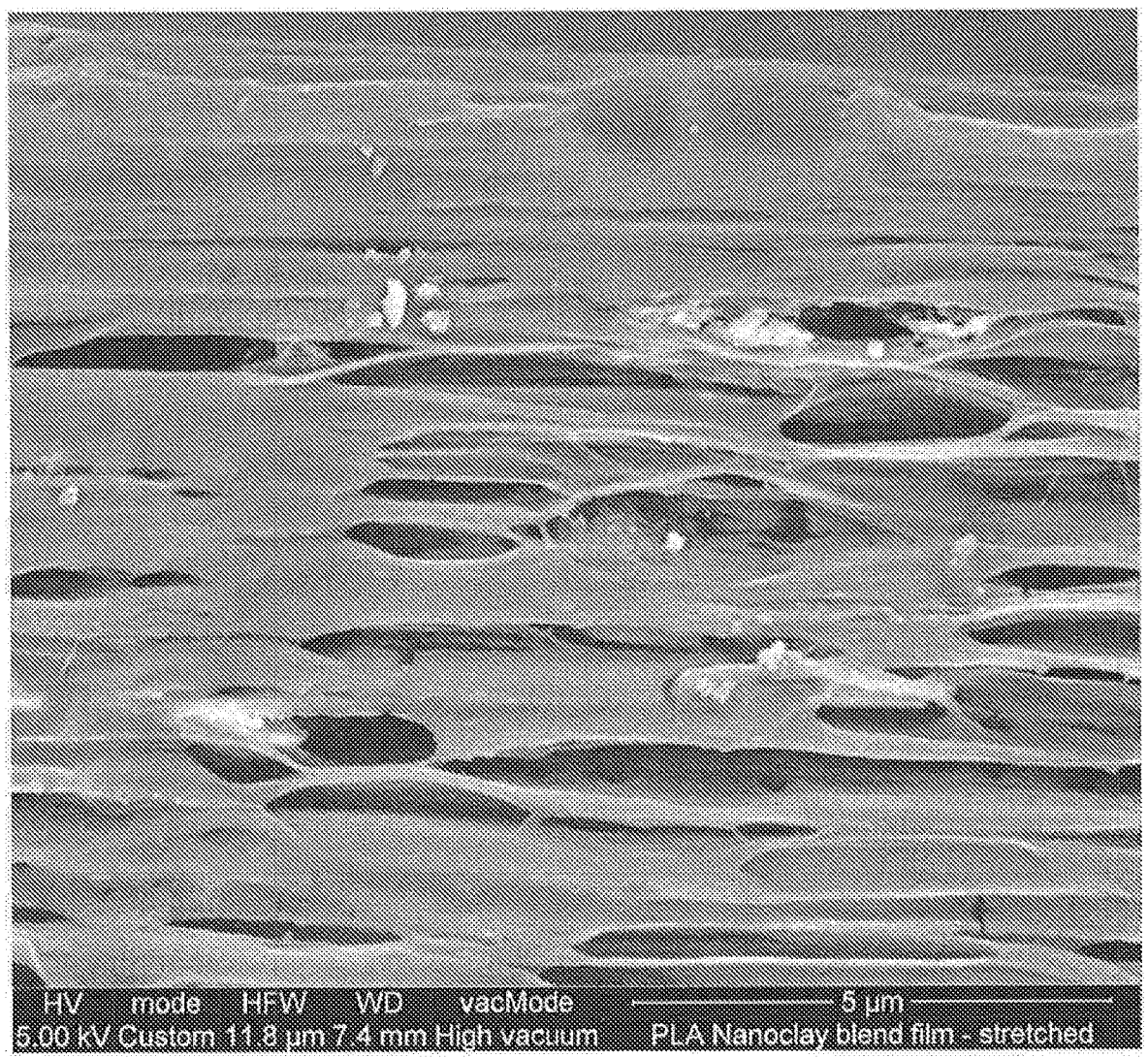

The morphology of the films was analyzed by scanning electron microscopy (SEM) before and after stretching. The results are shown in FIGS. 10-13. As shown in FIGS. 10-11, some of the nanoclay particles (visible as brighter regions) became dispersed in the form of very small domains—i.e., axial dimension ranging from about 50 to about 300 nanometers. The masterbatch itself also formed domains of a micro-scale size (axial dimension of from about 1 to about 5 micrometers). Also, the microinclusion additive (Vistamaxx™) formed elongated domains, while the nanoinclusion additives (Lotader®, visible as ultrafine dark dots and nanoclay masterbatch, visible as bright platelets) formed spheroidal domains. The stretched film is shown in FIGS. 12-13. As shown, the voided structure is more open and demonstrates a broad variety of pore sizes. In addition to highly elongated micropores formed by the microinclusions (Vistamaxx™), the nanoclay masterbatch inclusions formed more open spheroidal micropores with an axial size of about 10 microns or less and a transverse size of about 2 microns. Spherical nanopores are also formed by the nanoinclusion additives (Lotader® and nanoclay particles).

Various tensile properties (machine direction) of the films of Example 1 and 2 were also tested. The results are provided below in Table 3.

TABLE 3

| Example | Avg. Thickness (μm) | Avg. Modulus (MPa) | Avg. Yield Stress (MPa) | Avg. Break Stress (MPa) | Avg. Strain at Break (%) | Avg. Energy per Vol. (J/cm³) |
|---|---|---|---|---|---|---|
| 1 | 49 | 2066 | 48.1 | 35 | 236 | 73 |
| 2 | 56 | 1945 | 41.3 | 36 | 299 | 85 |

As shown, the addition of the nanoclay filler resulted in a slight increase in break stress and a significant increase in elongation at break.

Example 9

The ability to form fibers for use in thermal insulation was demonstrated. Initially, a precursor blend was formed from 91.8 wt. % isotactic propylene homopolymer (M3661, melt flow rate of 14 g/10 at 210° C. and melting temperature of 150° C., Total Petrochemicals), 7.4 wt. % polylactic acid (PLA 6252, melt flow rate of 70 to 85 g/10 min at 210° C., Natureworks®), and 0.7 wt. % of a polyepoxide. The polyepoxide was poly(ethylene-co-methyl acrylate-co-glycidyl methacrylate) (LOTADER® AX8900, Arkema) having a melt flow rate of 6 g/10 min (190° C./2160 g), a glycidyl methacrylate content of 8 wt. %, methyl acrylate content of 24 wt. %, and ethylene content of 68 wt. %. The components were compounded in a co-rotating twin-screw extruder (Werner and Pfleiderer ZSK-30 with a diameter of 30 mm and a L/D=44). The extruder had seven heating zones. The temperature in the extruder ranged from 180° C. to 220° C. The polymer was fed gravimetrically to the extruder at the hopper at 15 pounds per hour and the liquid was injected into the barrel using a peristaltic pump. The extruder was operated at 200 revolutions per minute (RPM). In the last section of the barrel (front), a 3-hole die of 6 mm in diameter was used to form the extrudate. The extrudate was air-cooled in a conveyor belt and pelletized using a Conair Pelletizer.

Figure 14:
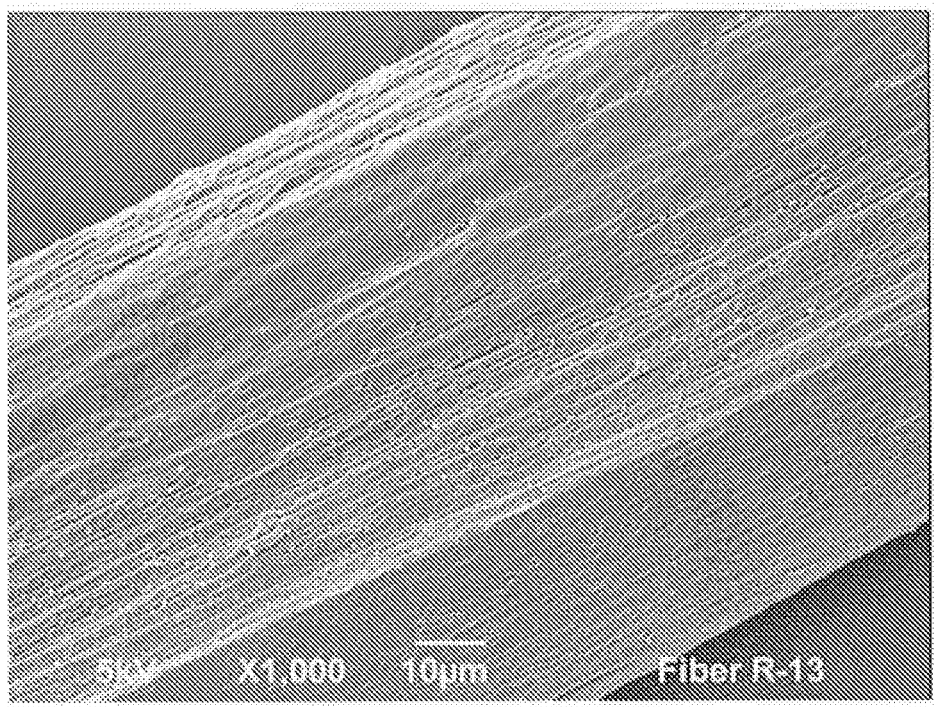
FIG. 14 is an SEM photomicrograph (1,000×) of the fiber of Example 9 (polypropylene, polylactic acid, and polyepoxide) after freeze fracturing in liquid nitrogen.
Figure 15:
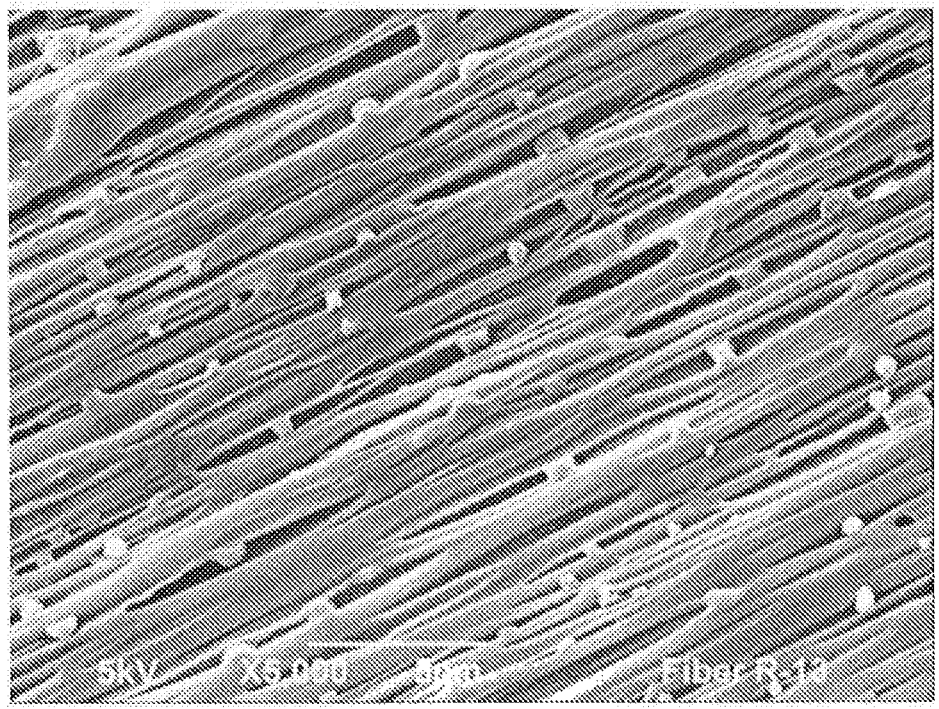
FIG. 15 is an SEM photomicrograph (5,000×) of the fiber of Example 9 (polypropylene, polylactic acid, and polyepoxide) after freeze fracturing in liquid nitrogen.
Figure 16:
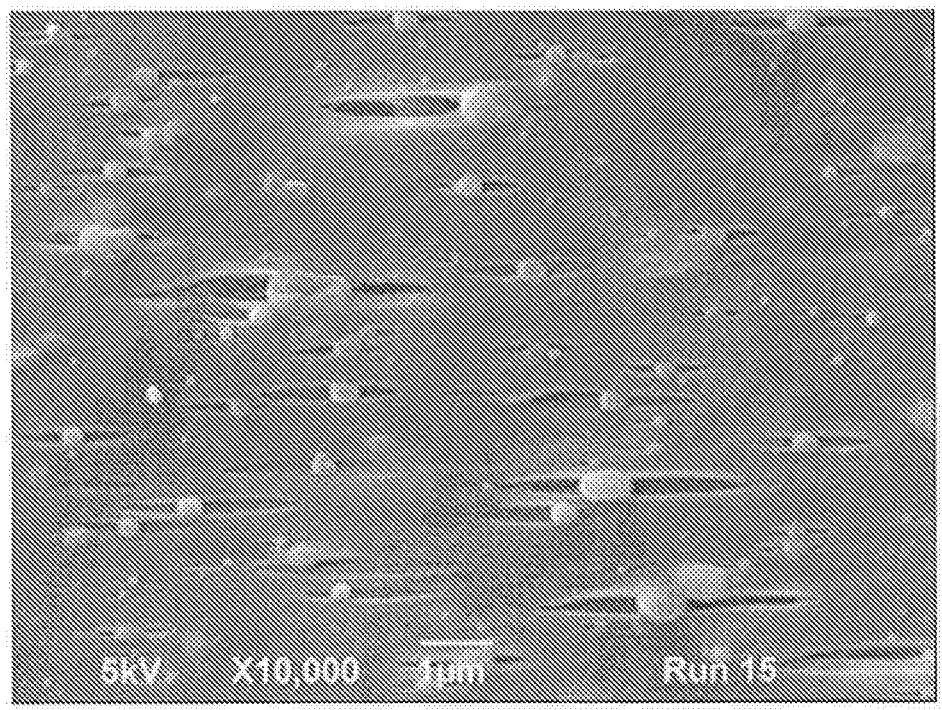
FIG. 16 is an SEM photomicrograph (10,000×) of the fiber surface of Example 9 (polypropylene, polylactic acid, and polyepoxide).

Fiber was then produced from the precursor blend using a Davis-Standard fiber spinning line equipped with a 0.75-inch single screw extruder and 16 hole spinneret with a diameter of 0.6 mm. The fibers were collected at different draw down ratios. The take up speed ranged from 1 to 1000 m/min. The temperature of the extruder ranged from 175° C. to 220° C. The fibers were stretched in a tensile tester machine at 300 mm/min up to 400% elongation at 25° C. To analyze the material morphology, the fibers were freeze fractured in liquid nitrogen and analyzed via Scanning Electron Microscope Jeol 6490LV at high vacuum. The results are shown in FIG. 14-16. As shown, spheroidal pores are formed that are elongated in the stretching direction. Both nanopores (~50 nanometers in width, ~500 nanometers in length) and micropores (~0.5 micrometers in width, ~4 micrometers in length) were formed.

Example 10

Pellets were formed as described in Example 1 and then flood fed into a single screw extruder at 240° C., melted, and passed through a melt pump at a rate of 0.40 grams per hole per minute through a 0.6 mm diameter spinneret. Fibers were collected in free fall (gravity only as draw force) and then tested for mechanical properties at a pull rate of 50 millimeters per minute. Fibers were then cold drawn at 23° C. in a MTS Synergie Tensile frame at a rate of 50 mm/min. Fibers were drawn to pre-defined strains of 50%, 100%, 150%, 200% and 250%. After drawing, the expansion ratio, void volume and density were calculated for various strain rates as shown in the tables below.

| Initial Length (mm) | Initial Diameter (mm) | Initial Volume (mm^3) | Strain % | Length after elongation (mm) | Diameter after elongation (mm) | Volume after elongation (mm^3) |
|---|---|---|---|---|---|---|
| 50 | 0.1784 | 1.2498 | 50.0 | 75 | 0.1811 | 1.9319 |
| 50 | 0.2047 | 1.6455 | 100.0 | 100 | 0.2051 | 3.3039 |
| 50 | 0.1691 | 1.1229 | 150.0 | 125 | 0.165 | 2.6728 |
| 50 | 0.242 | 2.2998 | 200.0 | 150 | 0.1448 | 2.4701 |
| 50 | 0.1795 | 1.2653 | 250.0 | 175 | 0.1062 | 1.5502 |

| Strain % | Poisson's Coefficient | Expansion Ratio | Void Volume (%) | Initial Density (g/cc) | Voided Density (g/cc) | Observation |
|---|---|---|---|---|---|---|
| 50 | −0.030 | 1.55 | 35.3 | 1.2 | 0.78 | No necking |
| 100 | −0.002 | 2.01 | 50.2 | 1.2 | 0.60 | No necking |
| 125 | 0.016 | 2.38 | 58.0 | 1.2 | 0.50 | No necking |

-continued

| Strain % | Poisson's Coefficient | Expansion Ratio | Void Volume (%) | Initial Density (g/cc) | Voided Density (g/cc) | Observation |
|---|---|---|---|---|---|---|
| 150 | 0.201 | 1.07 | 6.9 | 1.2 | 1.12 | necking |
| 175 | 0.163 | 1.23 | 18.4 | 1.2 | 0.98 | fully necked |

Example 11

Fibers were formed as described in Example 10, except that they were collected at a collection roll speed of 100 meters per minute resulting in a drawn down ratio of 77. Fibers were then tested for mechanical properties at a pull rate of 50 millimeters per minute. Fibers were then cold drawn at 23° C. in a MTS Synergie Tensile frame at a rate of 50 mm/min. Fibers were drawn to pre-defined strains of 50%, 100%, 150%, 200% and 250%. After drawing, the expansion ratio, void volume and density were calculated for various strain rates as shown in the tables below.

| Initial Length (mm) | Initial Diameter (mm) | Initial Volume (mm^3) | Strain % | Length after elongation (mm) | Diameter after elongation (mm) | Volume after elongation (mm^3) |
|---|---|---|---|---|---|---|
| 50 | 0.057 | 0.1276 | 50.0 | 75 | 0.0575 | 0.1948 |
| 50 | 0.0601 | 0.1418 | 100.0 | 100 | 0.0609 | 0.2913 |
| 50 | 0.067 | 0.1763 | 150.0 | 125 | 0.0653 | 0.4186 |
| 50 | 0.0601 | 0.1418 | 200.0 | 150 | 0.058 | 0.3963 |
| 50 | 0.0601 | 0.1418 | 200.0 | 150 | 0.0363 | 0.1552 |
| 50 | 0.059 | 0.1367 | 250.0 | 175 | 0.0385 | 0.2037 |

| Strain % | Poisson's Coefficient | Expansion Ratio | Void Volume (%) | Initial Density (g/cc) | Voided Density (g/cc) | Observation |
|---|---|---|---|---|---|---|
| 50 | −0.018 | 1.53 | 34.5 | 1.2 | 0.79 | 1 small neck ~1 mm in length |
| 100 | −0.013 | 2.05 | 51.3 | 1.2 | 0.58 | 2 small necks approximately 5 mm in length |
| 150 | 0.017 | 2.37 | 57.9 | 1.2 | 0.51 | No visible necking - fiber looks to be uniform |
| 200 | 0.017 | 2.79 | 64.2 | 1.2 | 0.43 | Average diameter taken from necked and unnecked reasons |
| 200 | 0.198 | 1.09 | 8.6 | 1.2 | 1.10 | Diameter only taken from necked region |
| 250 | 0.139 | 1.49 | 32.9 | 1.2 | 0.81 | Fully necked |

Example 12

Fibers were formed as described in Example 10, except that the blend was composed of 83.7 wt. % polylactic acid (PLA 6201D, Natureworks®), 9.3 wt. % of Vistamaxx™ 2120, 1.4 wt. % Lotader AX8900, 3.7% wt. % PLURIOL® WI 285, and 1.9% hydrophilic surfactant (Masil SF-19). The PLURIOL® WI285 and Masil SF-19 were premixed at a 2:1 (WI-285:SF-19) ratio and added via injector pump into barrel zone #2. Fibers were collected at 240° C., 0.40 ghm and under free fall.

Example 13

Fibers were formed as described in Example 12, except that they were collected at a collection roll speed of 100 meters per minute resulting in a drawn down ratio of 77. Fibers were then tested for mechanical properties at a pull rate of 50 millimeters per minute. Fibers were then cold drawn at 23° C. in a MTS Synergie Tensile frame at a rate of 50 mm/min. Fibers were drawn to pre-defined strain of 100%. After drawing, the expansion ratio, void volume and density were calculated as shown in the tables below.

| Example | Initial Length (mm) | Initial Diameter (mm) | Intial Volume (mm^3) | Strain % | Length after elongation (mm) | Diameter after elongation (mm) | Volume after elongation (mm^3) |
|---|---|---|---|---|---|---|---|
| 14 | 50 | 0.0626 | 0.1539 | 100.0 | 100 | 0.0493 | 0.1909 |

| Example | Poisson's Coefficient | Expansion Ratio | Void Volume (%) | Initial Density (g/cm³) | Voided Density (g/cm³) | Observation |
|---|---|---|---|---|---|---|
| 14 | 0.2125 | 1.24 | 19.4 | 1.2 | 0.97 | Localized necking throughout |

Example 14

Fibers from Example 12 were stretched in a MTS Synergie Tensile frame at a rate of 50 millimeters per minute to 250% strain. This opened up the void structure and turned the fiber white. A one inch sample was then cut from the stressed, white area of the fiber. The new fiber was then tested as described above. The density was estimated to be 0.75 grams per cubic centimeters and the pull rate for the tensile test was 305 mm/min.

Example 15

Fibers from Example 11 were heated in an oven at 50° C. for 30 minutes to anneal the fiber.

Example 16

Fibers from Example 11 were heated in an oven at 90° C. for 5 minutes to anneal the fiber and induce crystallization.

The fibers of Examples 10-16 were then tested for mechanical properties at a pull rate of 50 millimeters per minute. The results are set forth in the table below.

| Example | Diameter (μm) | Peak Load (g$_f$) | Peak Stress (MPa) | Strain at Break (%) | Energy to Break (J/cm^3) | Tenacity (g/g) | Density (g/cm³) |
|---|---|---|---|---|---|---|---|
| Control PLA Fibers | 207.8 | 217.06 | 62.8 | 3.8 | 0.8 | 0.57 | 1.25 |
| 10 | 184.6 | 126.65 | 47.3 | 484.5 | 154.0 | 0.44 | 1.20 |
| 11 | 62.2 | 22.57 | 73.1 | 464.1 | 205.1 | 0.69 | 1.20 |
| 12 | 128.5 | 70.32 | 53.2 | 635.3 | 216.0 | 0.50 | 1.20 |
| 13 | 59.1 | 16.17 | 57.8 | 495.8 | 184.4 | 0.55 | 1.20 |
| 14 | 108.5 | 92.95 | 101.3 | 110.8 | 71.2 | 1.49 | ~0.75 |
| 15 | 67.5 | 24.48 | 66.9 | 467.7 | 195.2 | 0.63 | 1.20 |
| 16 | 62.6 | 19.55 | 62.2 | 351.0 | 154.4 | 0.59 | 1.20 |

While the invention has been described in detail with respect to the specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A polymeric material for use in thermal insulation, wherein the polymeric material is a drawn polymeric material formed from a thermoplastic composition containing
a continuous phase that includes a matrix polymer,
a polymeric microinclusion additive and a polymeric nanoinclusion additive dispersed within the continuous phase in the form of discrete domains, and
from 0.1% to about 20 wt. % of an interphase modifier based upon the weight of the matrix polymer,
wherein the thermoplastic composition has a glass transition temperature of from about 35° C. to about 80° C.;
wherein the polymeric nanoinclusion additive is in the form of nano-scale domains and comprises a functionalized polyolefin and the polymeric microinclusion additive is in the form of micro-scale domains, wherein the micro-scale domains have an average cross-sectional dimension of from about 1 to about 250 micrometers and wherein the nano-scale domains have an average cross-sectional dimension of from about 1 nanometer to about 500 nanometers;
wherein a porous network is defined in the drawn polymeric material that includes a plurality of nanopores adjacent to the nano-scale domains and/or the micro-scale domains, the nanopores having an average cross-sectional dimension of about 800 nanometers or less, and micropores at and around the micro-scale domains, the micropores having an average cross-sectional dimension of about 1 to about 30 micrometers,
wherein the polymeric material exhibits a thermal conductivity of about 0.20 watts per meter-kelvin or less,
wherein the total pore volume of the polymeric material is from about 15% to about 80% per cubic centimeter, and wherein the plurality of nanopores constitutes from about 40 vol. % to about 99 vol. % of the total pore volume, and
wherein the drawn polymeric material is in a film or fiber.

2. The polymeric material of claim 1, wherein the polymeric material exhibits a thermal conductivity of from about 0.02 to about 0.10 watts per meter-kelvin.

3. The polymeric material of claim 1, wherein the polymeric material exhibits a thermal admittance of about 1000 watts per square meter-kelvins or less.

4. The polymeric material of claim 1, wherein the nanopores have an average cross-sectional dimension of from about 5 to about 400 nanometers.

5. The polymeric material of claim 1, wherein the total pore volume of the polymeric material is from about 20% to about 70% per cubic centimeter.

6. The polymeric material of claim 1, wherein the nanopores constitute about 20 vol. % or more of the total pore volume of the polymeric material.

7. The polymeric material of claim 1, wherein the continuous phase constitutes from about 60 wt. % to about 99 wt. % of the thermoplastic composition.

8. The polymeric material of claim 1, wherein the matrix polymer includes a polyester or polyolefin.

9. The polymeric material of claim 1, wherein the polymeric microinclusion additive includes a polyolefin.

10. The polymeric material of claim 1, wherein the polymeric nanoinclusion additive includes a polyepoxide.

11. The polymeric material of claim 1, wherein the polymeric microinclusion additive constitutes from about 1 wt. % to about 30 wt. % of the composition, based on the weight of the continuous phase.

12. The polymeric material of claim 1, wherein the polymeric nanoinclusion additive constitutes from about 0.05 wt. % to about 20 wt. % of the composition, based on the weight of the continuous phase.

13. The polymeric material of claim 1, wherein the interphase modifier is a silicone, silicone-polyether copolymer, aliphatic polyester, aromatic polyester, alkylene glycol, alkane diol, amine oxide, fatty acid ester, or a combination thereof.

14. The polymeric material of claim 1, wherein the porous network further includes micropores having an average cross-sectional dimension of from about 1 to about 20 micrometers.

15. The polymeric material of claim 14, wherein the aspect ratio of the micropores is from about 1 to about 30.

16. The polymeric material of claim 1, wherein the drawn polymeric material comprises a total pore volume of from 34.5% to 64.2%.

17. The polymeric material of claim 1, wherein the drawn polymeric material has a density of 1.0 g/cm$^3$ to 1.2 g/cm$^3$.

18. Thermal insulation comprising the polymeric material of claim 1.

19. A building panel or section comprising the thermal insulation of claim 18.

20. An automotive component comprising the thermal insulation of claim 18.

21. An article of apparel comprising the thermal insulation of claim 18.

22. An article of furniture or bedding comprising the thermal insulation of claim 18.

* * * * *